(12) United States Patent
Guemmer

(10) Patent No.: US 8,152,467 B2
(45) Date of Patent: Apr. 10, 2012

(54) BLADE WITH TANGENTIAL JET GENERATION ON THE PROFILE

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 930 days.

(21) Appl. No.: 12/213,878

(22) Filed: Jun. 25, 2008

(65) Prior Publication Data

US 2009/0003989 A1    Jan. 1, 2009

(30) Foreign Application Priority Data

Jun. 26, 2007   (DE) .................. 10 2007 029 367

(51) Int. Cl.
*F01D 5/18* (2006.01)
*F03B 3/12* (2006.01)
(52) U.S. Cl. ........................... 416/91; 416/232
(58) Field of Classification Search ................ None
See application file for complete search history.

(56) References Cited

U.S. PATENT DOCUMENTS

| | | | | |
|---|---|---|---|---|
| 2,701,120 A | * | 2/1955 | Stalker | 416/90 R |
| 2,759,663 A | * | 8/1956 | Stalker | 416/90 R |
| 2,807,437 A | * | 9/1957 | Roush | 416/233 |
| 2,870,957 A | | 1/1959 | Stalker | |
| 2,933,238 A | | 4/1960 | Stalker | |
| 3,306,576 A | * | 2/1967 | Chaboseau | 415/115 |
| 3,700,418 A | * | 10/1972 | Mayeda | 428/613 |
| 4,229,140 A | * | 10/1980 | Scott | 416/97 R |
| 4,303,374 A | * | 12/1981 | Braddy | 416/97 R |
| 4,676,719 A | * | 6/1987 | Auxier et al. | 416/97 R |
| 4,705,455 A | * | 11/1987 | Sahm et al. | 416/97 R |
| 4,827,587 A | | 5/1989 | Hall et al. | |
| 5,419,681 A | * | 5/1995 | Lee | 416/97 R |
| 5,480,284 A | | 1/1996 | Wadia et al. | |
| 5,651,662 A | | 7/1997 | Lee et al. | |
| 5,660,525 A | * | 8/1997 | Lee et al. | 416/97 R |
| 5,690,473 A | | 11/1997 | Kercher | |
| 6,213,714 B1 | | 4/2001 | Rhodes | |
| 6,234,755 B1 | * | 5/2001 | Bunker et al. | 416/97 R |
| 6,241,466 B1 | * | 6/2001 | Tung et al. | 415/115 |
| 6,334,753 B1 | | 1/2002 | Tillman et al. | |
| 6,923,247 B1 | * | 8/2005 | Ferber et al. | 165/47 |
| 7,387,487 B2 | * | 6/2008 | Guemmer | 415/115 |
| 7,553,534 B2 | * | 6/2009 | Bunker | 428/137 |

OTHER PUBLICATIONS

German Search Report dated Oct. 17, 2011 from counterpart application.

* cited by examiner

*Primary Examiner* — Scott B Geyer
(74) *Attorney, Agent, or Firm* — Timothy J. Klima; Shuttleworth & Ingersoll, PLC

(57) ABSTRACT

A blade of a fluid-flow machine has at least one cavity 2 arranged in the blade 1, with the cavity 2 connecting to a fluid supply, and at least one outlet opening 3 connecting the cavity 2 to a flow path, in which the blade 1 is arranged. The outlet opening 3 is of a nozzle-type design and essentially inclined in a direction of a main flow extending longitudinally to a corresponding surface of the blade 1. The outlet opening 3 extends over at least a part of the blade 1 height and the outlet opening 3 forms a step in a contour of the blade 1 profile, with a fluid jet issuing from the outlet opening 3 essentially tangentially attaching onto the blade surface.

28 Claims, 22 Drawing Sheets

Fig. 1 (Prior Art)
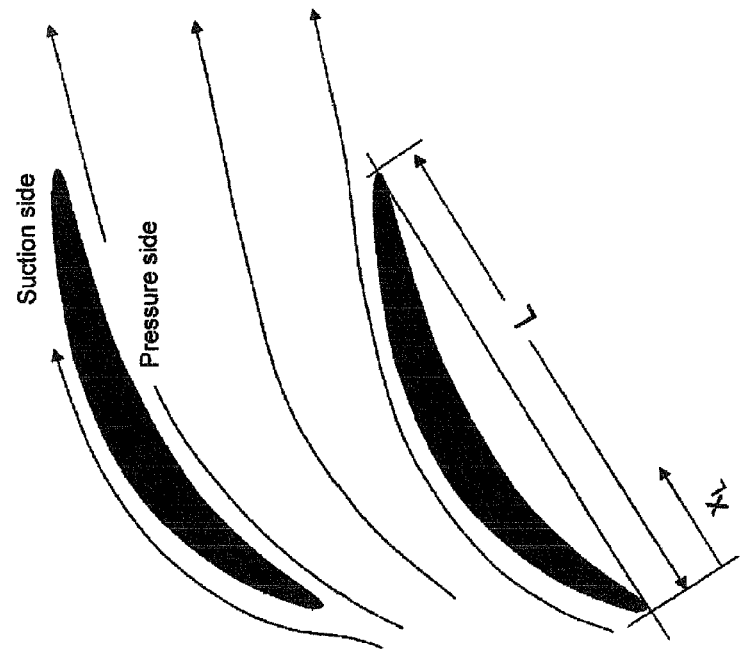
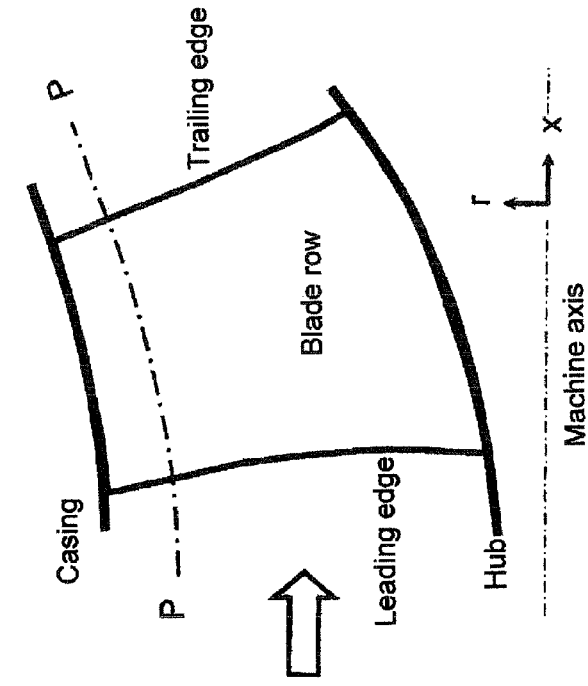

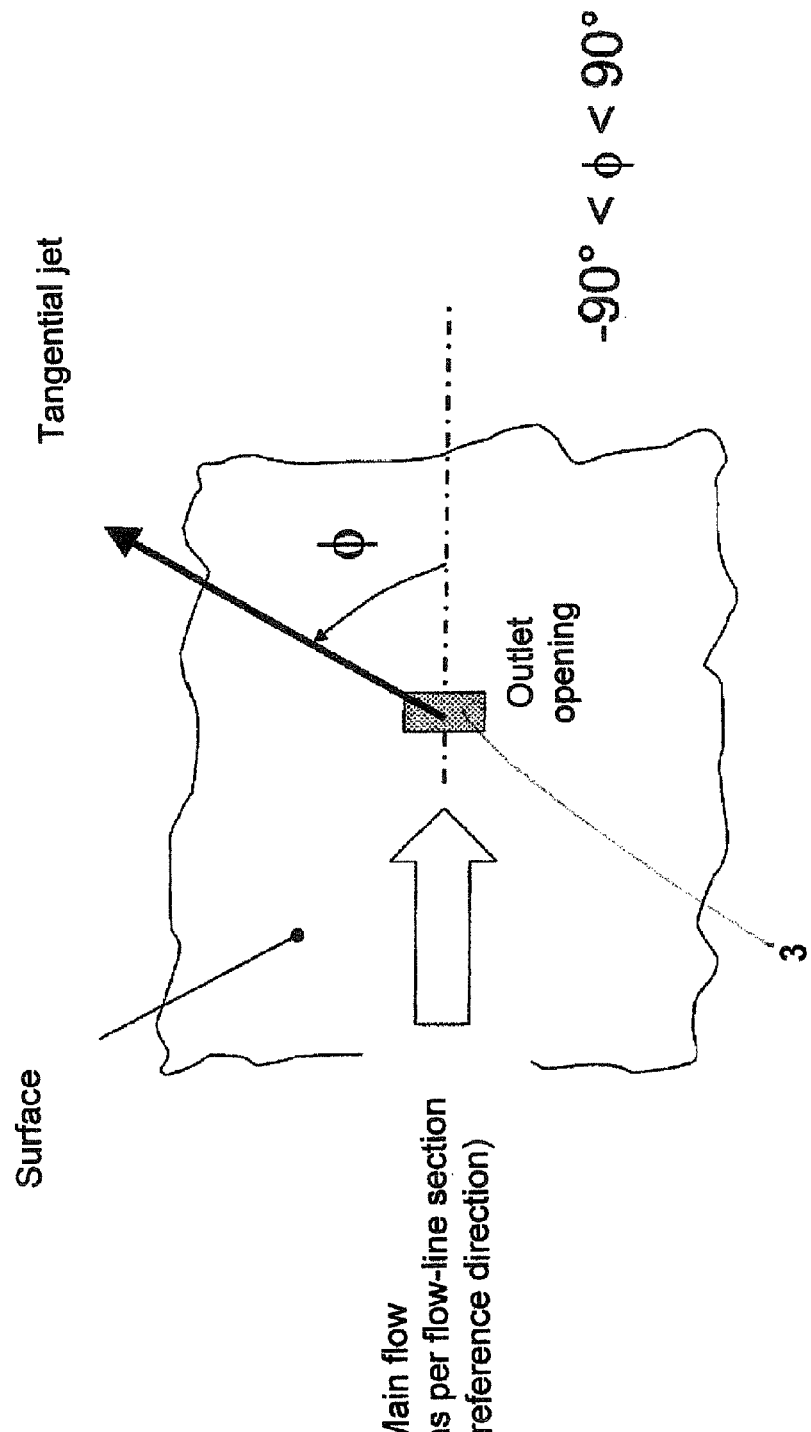

Fig. 5D
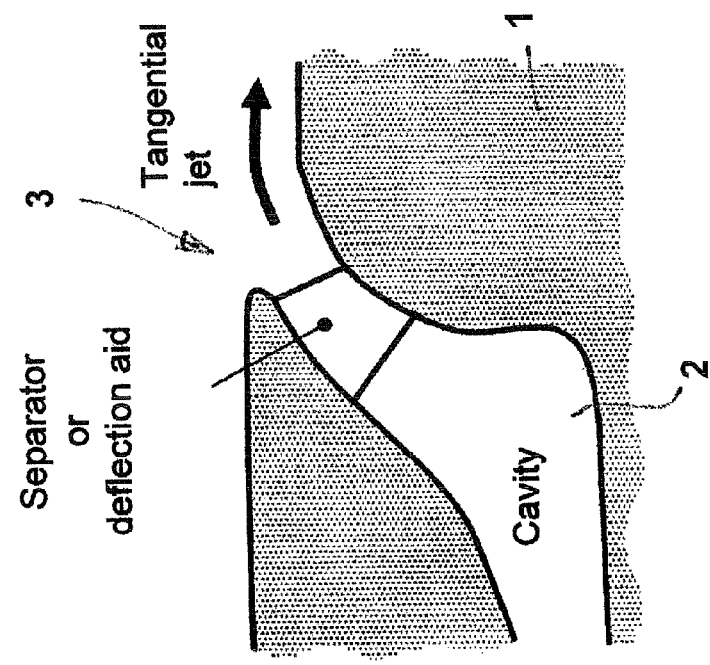
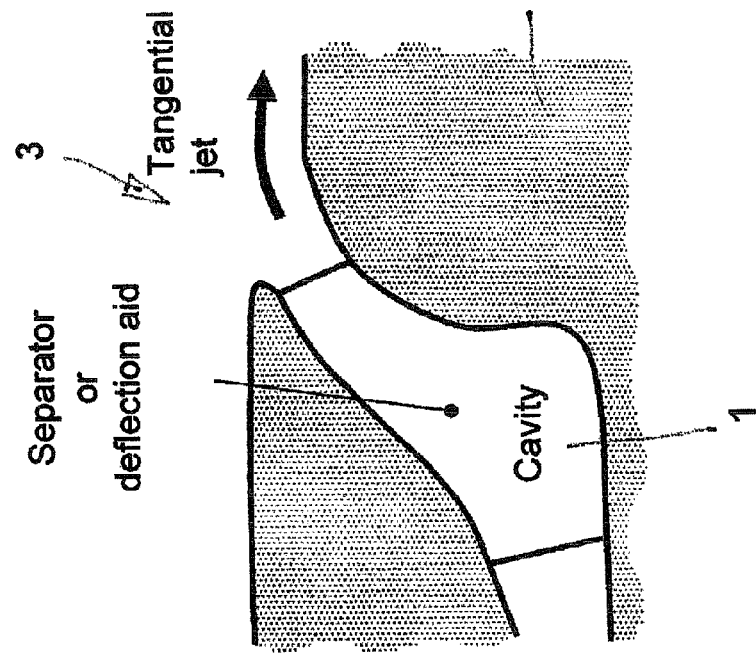

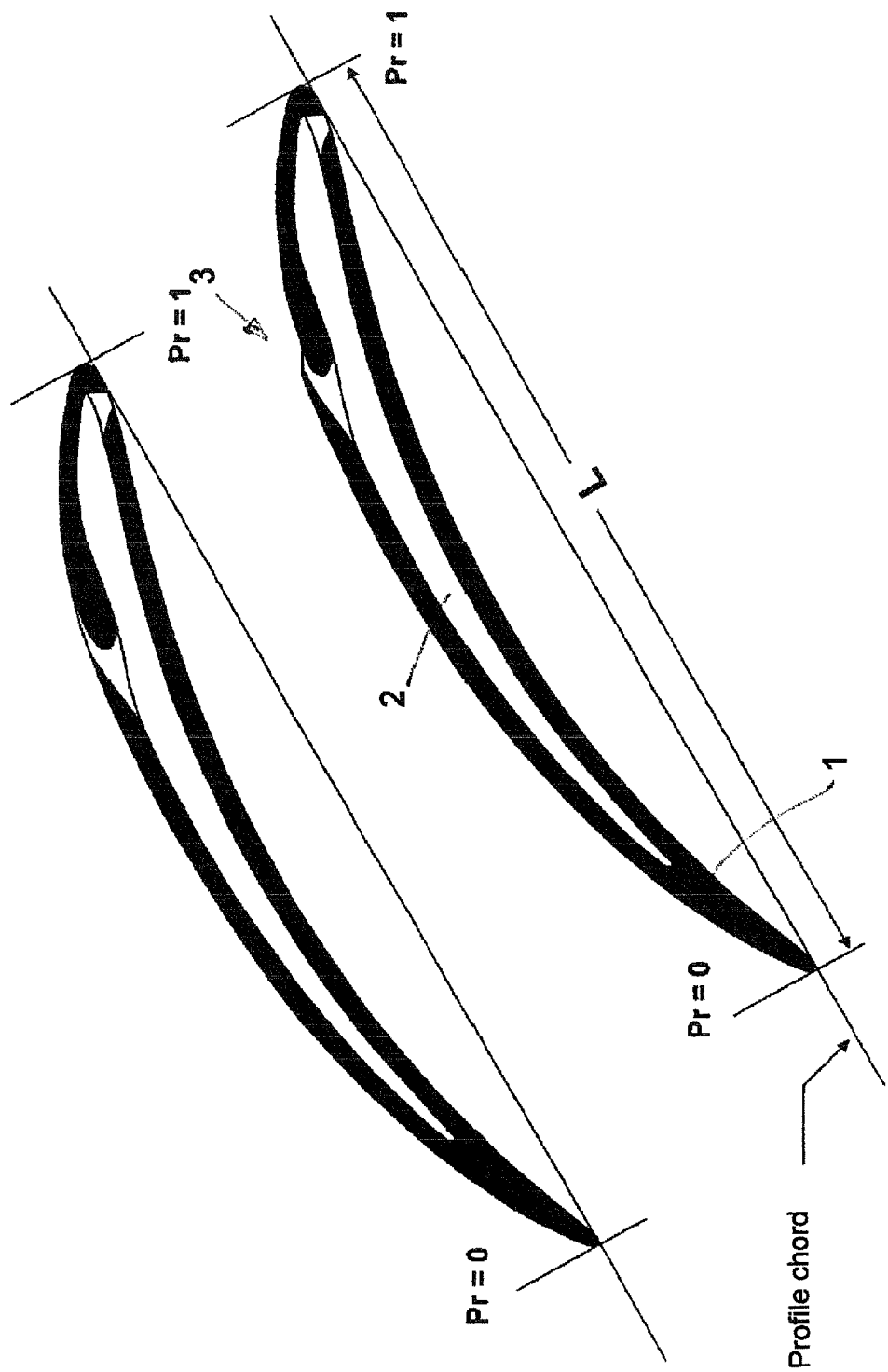

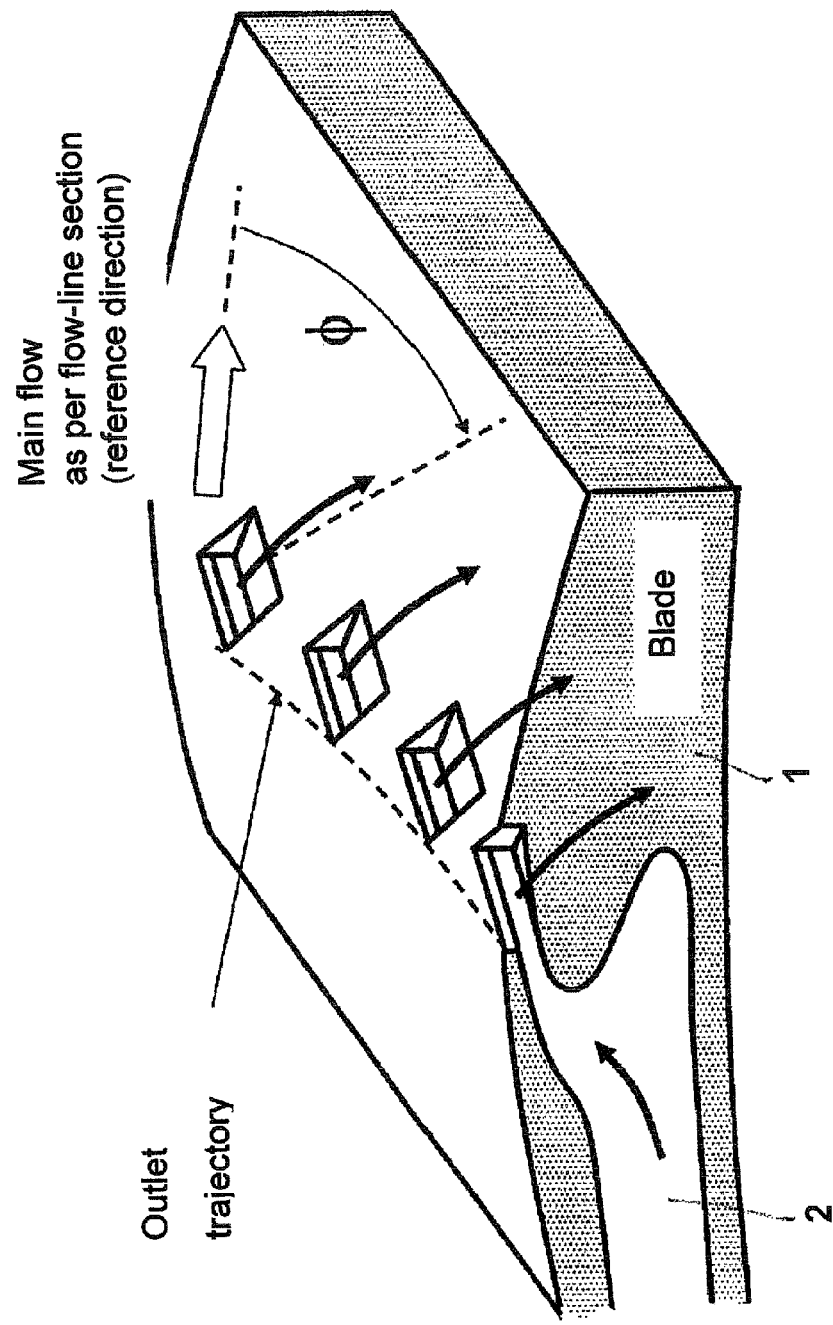

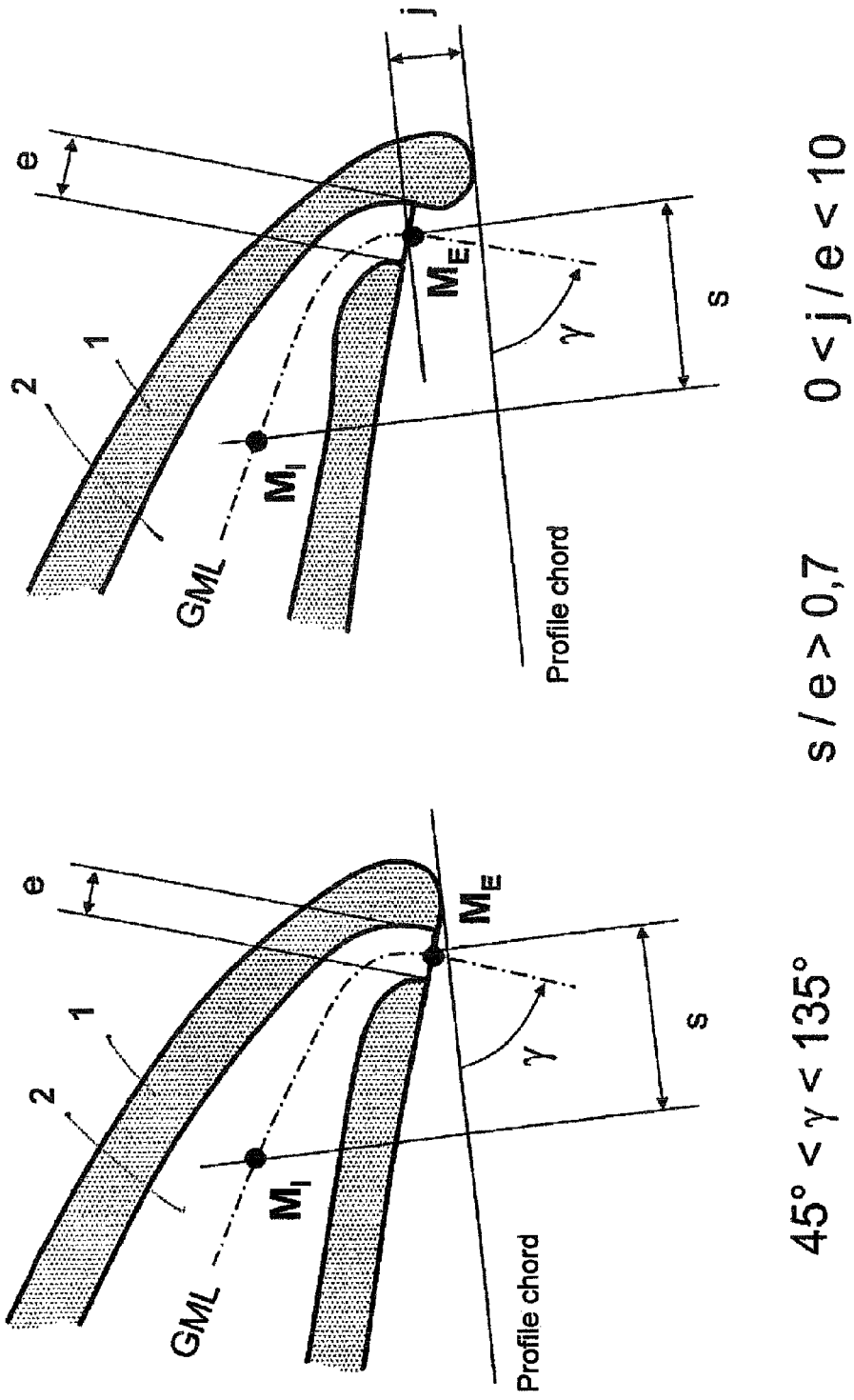

BLADE WITH TANGENTIAL JET GENERATION ON THE PROFILE

This application claims priority to German Patent Application DE_102007029367.6 filed Jun. 26, 20007, the entirety of which is incorporated by reference herein.

Figure 2:
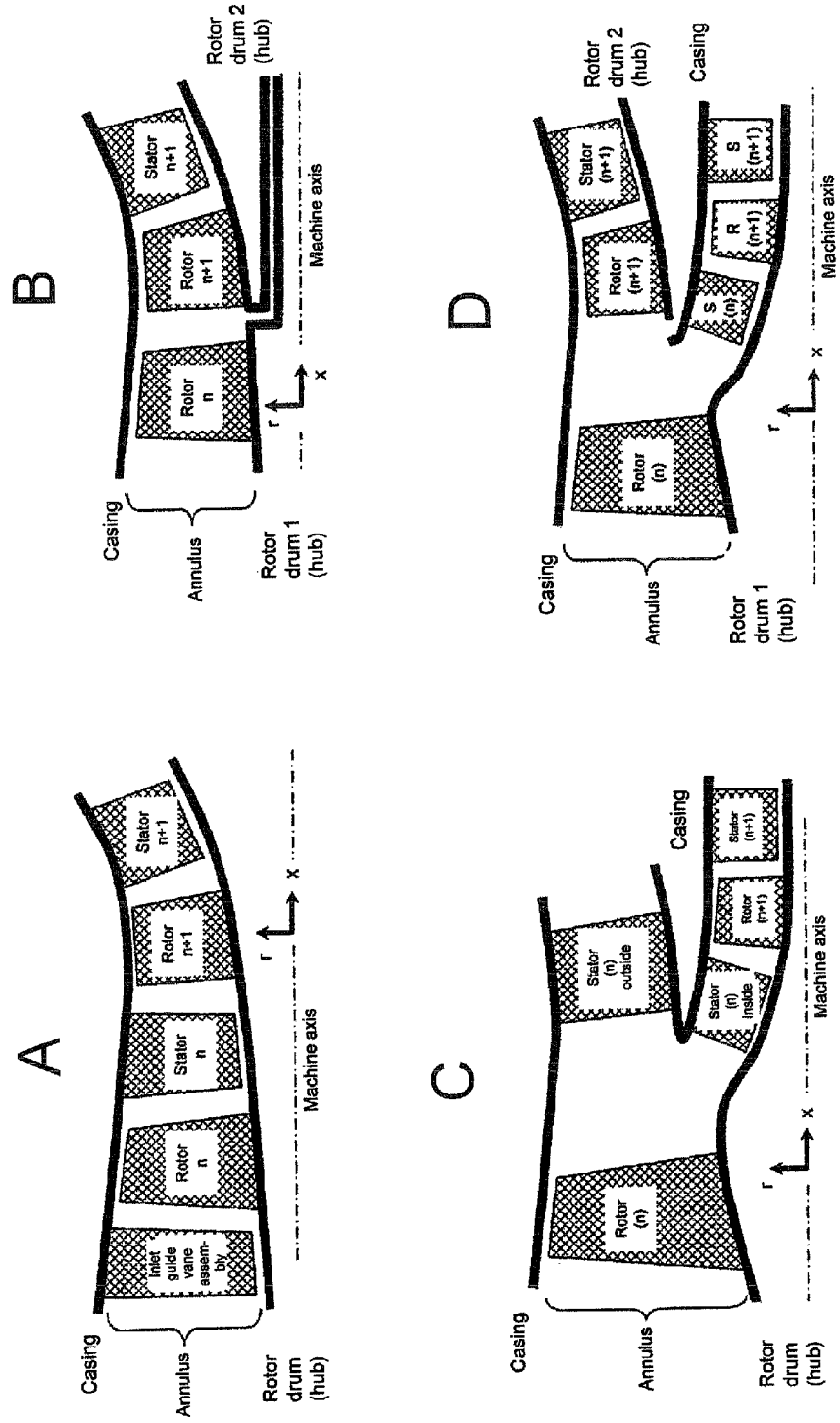

The present invention relates to blades of fluid-flow machines, such as blowers, compressors, pumps and fans of the axial, semi-axial and radial type using gaseous or liquid working media. The fluid-flow machine may comprise one or several stages, each having a rotor and a stator, or in individual cases, the stage having a rotor only. The rotor includes a number of blades, which are connected to the rotating shaft of the machine and transfer energy to the working medium. The rotor may be designed with or without shrouds at the outer blade ends. The stator includes a number of stationary blades, which may either feature a fixed or a free blade end on the hub and on the casing side. Rotor drum and blading are usually enclosed by a casing, in other cases, such as aircraft or ship propellers, no such casing exists. The machine may also include a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus. In an alternative configuration, multi-stage types of said fluid-flow machines may have two counter-rotating shafts, with the direction of rotation of the rotor blade rows alternating between stages. Here, no stators exist between subsequent rotors. Finally, the fluid-flow machine may—alternatively—feature a bypass configuration such that the single-flow annulus divides into two concentric annuli behind a certain blade row, with each of these annuli housing at least one further blade row. FIG. 2 shows examples of four possible configurations of fluid-flow machines.

The aerodynamic loadability and the efficiency of fluid-flow machines, for example blowers, compressors, pumps and fans, is limited by the growth and the separation of boundary layers on the blades as well as on the hub and casing walls. To remedy this fundamental problem, the state of the art provides solutions only to a limited extent. With regard to fluid supply, various concepts for turbine blades exist, but these are not applicable to fluid-flow machines since they essentially serve for surface cooling, not for boundary layer energization.

From compressor cascade experiments, concepts are known in which air is blown out from a pressurized chamber in the blade interior to the blade suction side to energize the two-dimensional profile boundary layer. Improvement of the blade performance values failed in this case, since the provision of appropriately disposed and designed blow-out openings turned out to be very difficult. Related alternative solutions provide for direct passage of the fluid from the blade pressure side to the blade suction side. Here again, no significant increase of the blade performance values could be obtained due to an unfavorably selected geometry of the passages. In addition, a concept exists for rotors which provides for the supply of air at the hub and casing via slots extending in the circumferential direction of the machine, to influence the wall boundary layers there.

Finally, there are concepts in which rotors are blown from individual nozzles in the vicinity of the casing to favorably influence the radial gap flow there. The general idea of influencing the boundary layer by insufflation or fluid supply, respectively, is accordingly contained in the state of the art, but the known solutions are effective to only a limited degree.

The state of the art, as described in the above is, among others, documented in the following publications:
U.S. Pat. No. 5,690,473
U.S. Pat. No. 6,334,753
U.S. Pat. No. 2,870,957
U.S. Pat. No. 2,933,238
U.S. Pat. No. 5,480,284

The flow in the blade rows of aerodynamically highly loaded fluid-flow machines is characterized by the very high degree of re-direction to be attained. The required re-direction of the fluid flow can be so extreme, either in parts of the blade height or along the entire blade height, that premature separation of the boundary layer flow on the blade profile and in the side-wall area on the hub and casing will occur with conventionally designed state-of-the-art blade profile sections.

Conventional blades without additional design features for stabilizing the profile and wall boundary layers, as shown in FIG. 1, are unsuitable due to the occurrence of extremely high pressure losses and the inability to attain the flow re-direction required. In consequence, the fluid-flow machine will have a generally inferior performance as regards efficiency and the stability margin available.

Blade rows with a profile design according to the state of the art, see FIG. 1, have too small an operating range and too high losses to attain the operating characteristics required for modern fluid-flow machines, this being due to the high aerodynamic loading of the boundary layers, especially the two-dimensional boundary layers on the profile. The solutions so far proposed for fluid supply to the surfaces of the blade did not show the desired effect due to unfavorably selected dimension, shape, orientation or positioning of the outlet.

In a broad aspect, the present invention provides for a blade of a fluid-flow machine of the type specified at the beginning above which is characterized by high efficiency.

More particularly, the present invention relates to a stator or rotor blade row of a fluid-flow machine which features the following common characteristics:

a.) at least one cavity disposed in the interior of at least one blade of the blade row, b.) in the area of at least one blade of the blade row at least one outlet connecting to a said cavity and disposed on one main flow-wetted surface of the blade profile (blade suction side or blade pressure side), with the outlet being designed such that it has, in at least one sectional plane considered, a nozzle-type shape essentially inclined in the main flow direction, that the outlet opening forms a step in the contour of the blade profile, and that, by virtue of this property, a fluid jet issuing from the outlet opening essentially tangentially attaches onto the respective surface.

The present invention provides a blade for use in a fluid-flow machine which is of the hollow type and is provided with at least one specifically formed outlet for tangential jet generation on at least one of its profile sides such that fluid is enabled to issue in an aerodynamically favorable way from a blade inner chamber onto the blade outer surface over the entirety or a part of the duct height.

Further description of the present invention:

1. A stator or rotor blade row for use in a fluid-flow machine, in particular an aircraft engine, characterized by the following features:

a.) at least one cavity disposed in the interior of at least one blade of the blade row and connecting to at least one flow path supplying fluid to the cavity, b.) on at least one blade of the blade row at least one outlet connecting to a said cavity and disposed on at least one main flow-wetted surface of the blade profile, suction side or pressure side, and there supplying fluid to the main flow, with the outlet being designed such that it has, in at least one sectional plane considered, a nozzle-type shape essentially inclined in the main flow direction, that it extends over the entirety or a part of the annulus width or the blade height, respectively, that its outlet opening forms a step in the contour of the blade profile, and that, by virtue of this property, a fluid jet issuing from the outlet opening essentially tangentially attaches onto the respective surface.

2. A blade row in accordance with item 1, with a least one separator being provided in the area of the outlet or also in the area of the cavity which divides or, similar to a blade cascade, also deflects the fluid flow supplied before said fluid flow issues as tangential jet onto the blade surface.

3. A blade row in accordance with item 1 or 2, with the jet direction at the location of the outlet opening and the direction of the main or boundary layer flow at the blade profile, by virtue of the design of the outlet, including a shear angle $\phi$ which has values in the angular range $-90°<\phi<90°$.

4. A blade row in accordance with one of the items 1 to 3, with the design of the outlet being defined as follows:
   a.) the throat of the outlet is at or near the outlet opening,
   b.) the outlet has, from the throat towards the blade interior, a cross-sectional width which continually increases over the entire effective length k, corresponding to a nozzle-type shape between the beginning and the end circle centers MI and ME,
   c.) the effective length k, relative to the throat width e, lies in the value range $k/e>0.7$,
   d.) the mouth angle $\gamma$ included by the tangents TGO and TGA lies in the value range $0°<\gamma<60°$,
   e.) the step height f, relative to the throat width e, lies in the value range $0<f/e<3$.

5. A blade row in accordance with one of the items 1 to 4, with at least one outlet for tangential jet generation being provided in a particularly effective way in the area of the relative profile depth $0.5<Pr<0.85$ on the blade suction side.

6. A blade row in accordance with one of the items 1 to 4, with at least one outlet for tangential jet generation being provided in a particularly effective way in the area of the relative profile depth $0.1<Pr<0.4$ on the blade pressure side.

7. A blade row in accordance with one of the items 1 to 4, characterized in that at least one outlet for tangential jet generation is provided in a particularly effective way in the area of the relative profile depth $0.8<Pr<1.0$ on the blade suction side.

8. A blade row in accordance with one of the items 1 to 4, characterized in that at least one outlet for tangential jet generation is provided in a particularly effective way in the area of the relative profile depth $0.5<Pr<0.85$ on the blade pressure side.

9. A blade row in accordance with one of the items 1 to 4, characterized in that at least one outlet for tangential jet generation is provided on the blade suction side and—at the same time—at least one outlet for tangential jet generation is provided on the blade pressure side.

10. A blade row in accordance with item 9, characterized in that at least one outlet is provided on the suction side in the area of the relative profile depth $0.5<Pr<0.85$ and at least one outlet on the pressure side in the area of the relative profile depth $0.1<Pr<0.4$.

11. A blade row in accordance with item 9, characterized in that at least one outlet is provided on the suction side in the area of the relative profile depth $0.8<Pr<1.0$ and at least one outlet on the pressure side in the area of the relative profile depth $0.5<Pr<0.85$.

12. A blade row in accordance with one of the items 1 to 4, characterized in that at least two outlets for tangential jet generation are provided one behind the other on the blade suction side in flow direction.

13. A blade row in accordance with one of the items 1 to 4, characterized in that at least two outlets for tangential jet generation are provided one behind the other on the blade pressure side in flow direction.

14. A blade row in accordance with one of the items 1 to 13, characterized in that—complementary to a tangential jet generation provided—at least one further outlet is arranged in the area of the profile trailing edge which, by virtue of its orientation, effects a jet generation oriented non-tangentially to the profile enveloping flow.

15. A blade row in accordance with item 14, characterized in that at least one said complementary outlet is provided in a particularly effective way in the area of the relative profile depth $0.9<Pr<1.0$ on the blade pressure side.

16. A blade row in accordance with item 14 or 15, characterized in that the design of the complementary outlet is defined as follows:
   a.) the throat of the outlet is at or near the outlet opening,
   b.) the outlet has, from the throat towards the blade interior, a cross-sectional width which continually increases over the entire effective extension s (nozzle-type shape between the beginning and the end circle centers MI and ME),
   c.) the effective extension s, relative to the throat width e, lies in the value range $s/e>0.7$,
   d.) the mouth angle $\gamma$ included by the tangents TGO and TGA lies in the value range $45°<\gamma<135°$,
   e.) the trailing edge protrusion depth j, relative to the throat width e, lies in the value range $0<j/e<10$.

17. A blade row in accordance with one of the items 1 to 16, characterized in that at least one outlet on the blade surface concerned has a trajectory which, continually or sectionally, agrees with the edge of the outlet step (line orientation).

18. A blade row in accordance with one of the items 1 to 16, characterized in that at least one outlet on the blade surface concerned has a trajectory which, only in places, touches the edge of rotatedly arranged openings (rotated orientation).

19. A blade row in accordance with item 17 or 18, characterized in that at least one outlet along the trajectory comprises several partial openings created by subdivision in round-hole, oblong, square or slot style and can be varied with regard to distance and shape.

20. A blade row in accordance with one of the items 1 to 19, characterized in that by way of specific activation and deactivation of the fluid supply of at least one outlet, controllability of the outlet flow direction of the blade row with a variation range of the outlet flow angle of more than 5 degrees is achieved in at least one partial area of the annulus width or the blade height, respectively.

21. A blade row in accordance with one of the items 1 to 20, characterized in that the first stator row downstream of the fan (blower) of an aircraft engine in the core or bypass flow is here concerned.

22. A blade row in accordance with one of the items 1 to 20, characterized in that a stator row of a multi-stage high- or medium-pressure compressor of an aircraft engine is here concerned.

23. A blade row in accordance with item 21 or 22, characterized in that at the center of the annulus, the profile depth of the stator exceeds the profile depth of an immediately downstream or upstream rotor by at least 20 percent.

24. A blade row in accordance with one of the items 1 to 23, characterized in that the ratio of the annulus width at the blade leading edge to the profile depth at the center of the annulus is less than 1.

Figure 3:
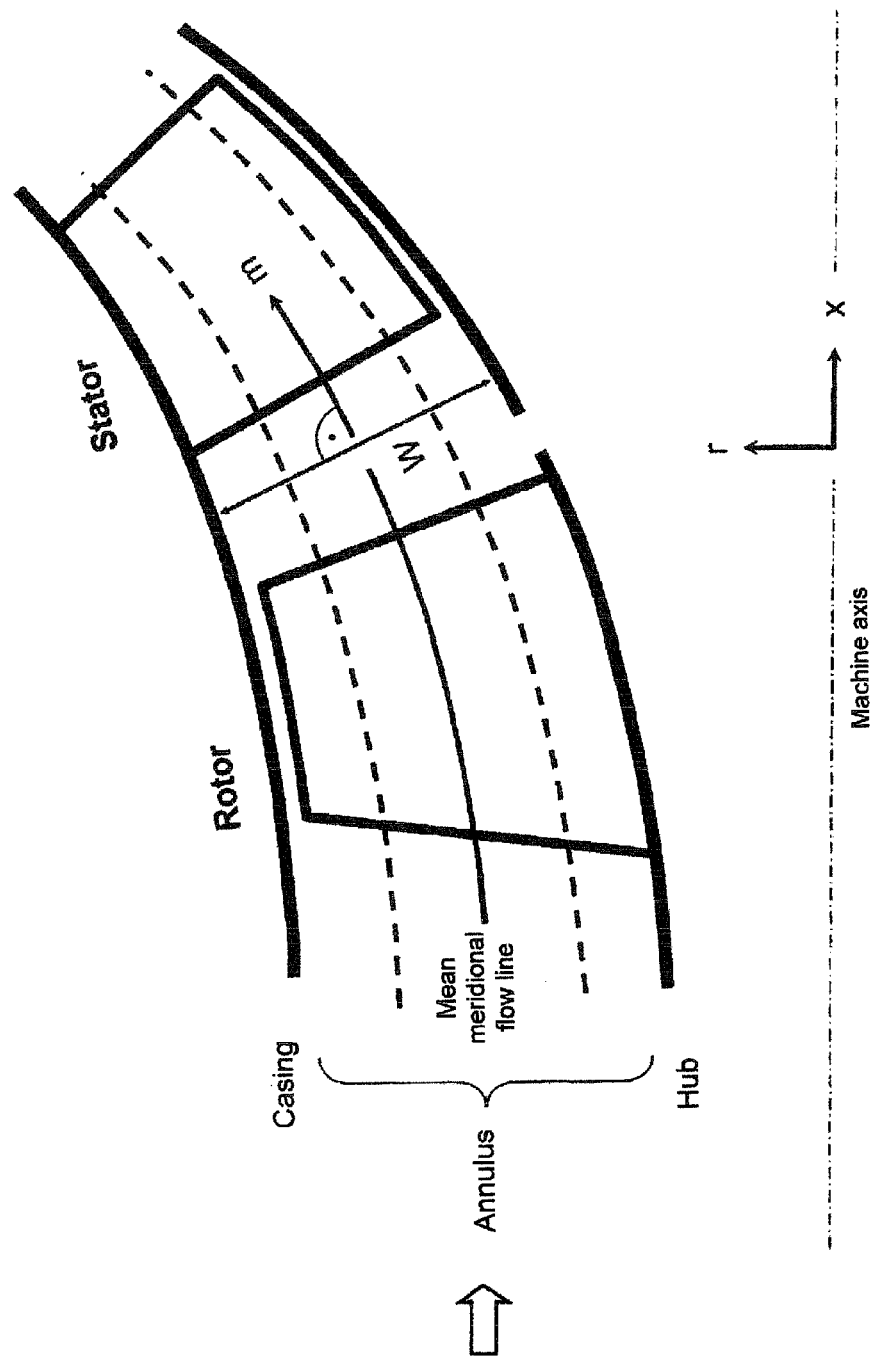
Figure 5B:
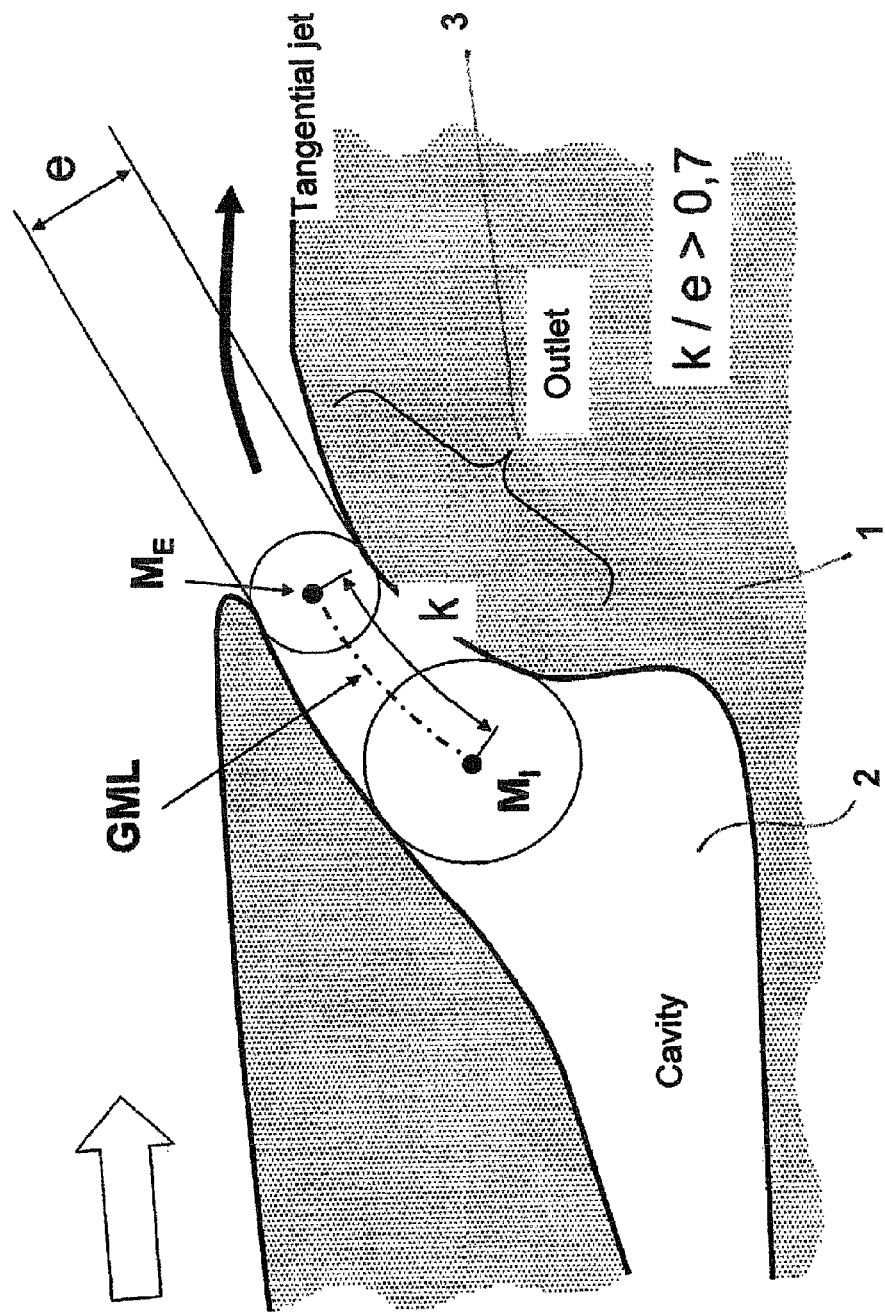
Figure 5C:
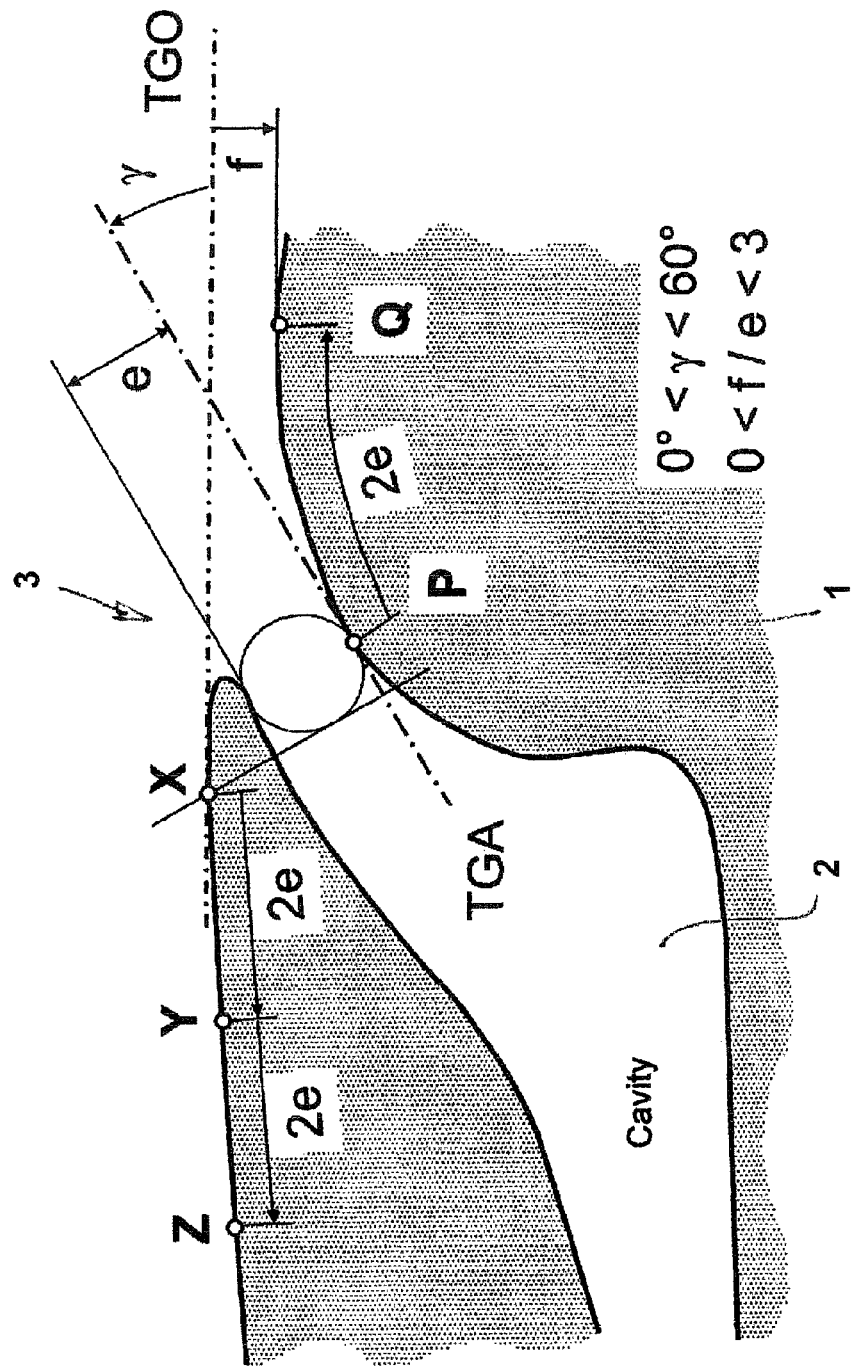
Figure 6A:
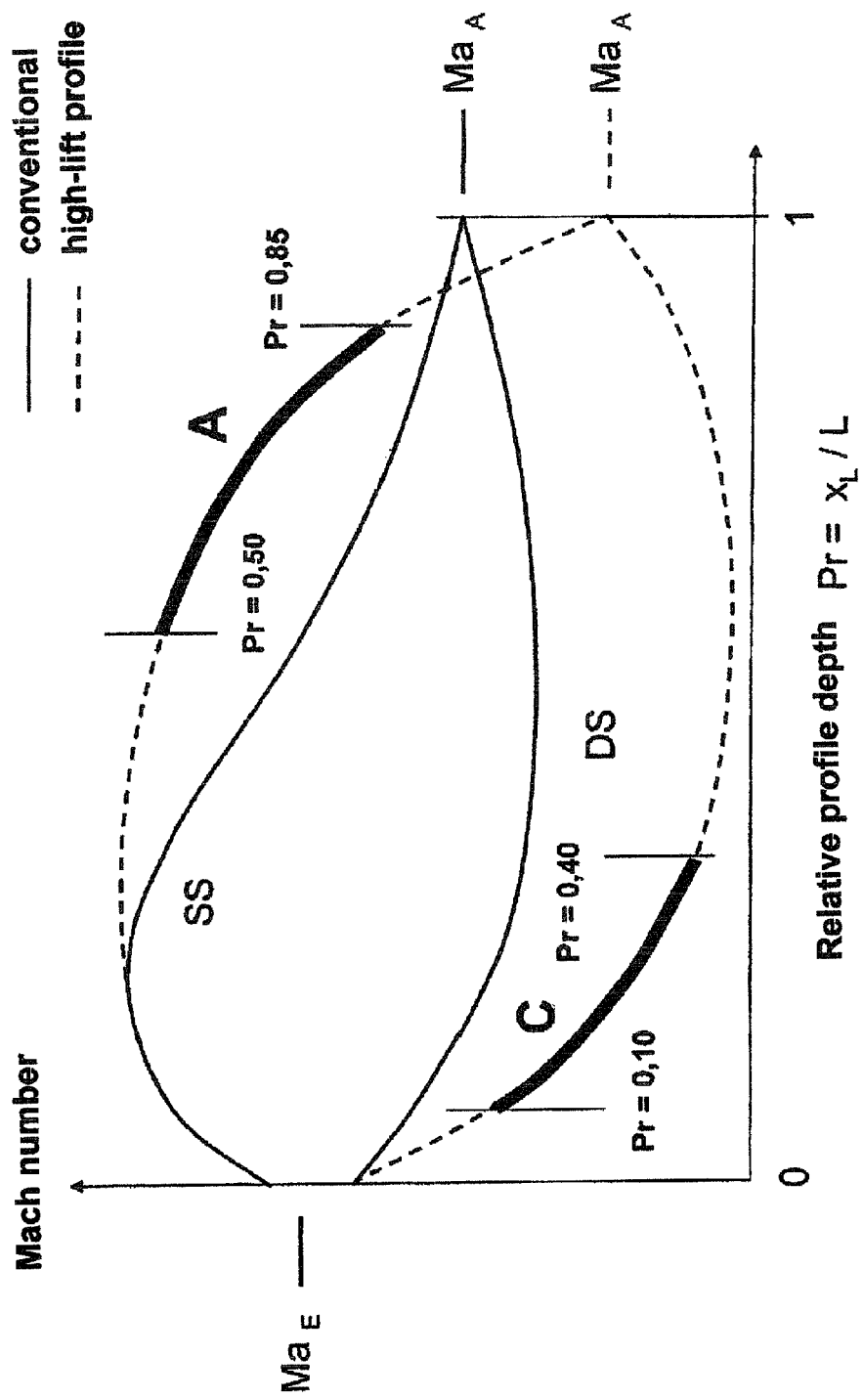
Figure 6B:
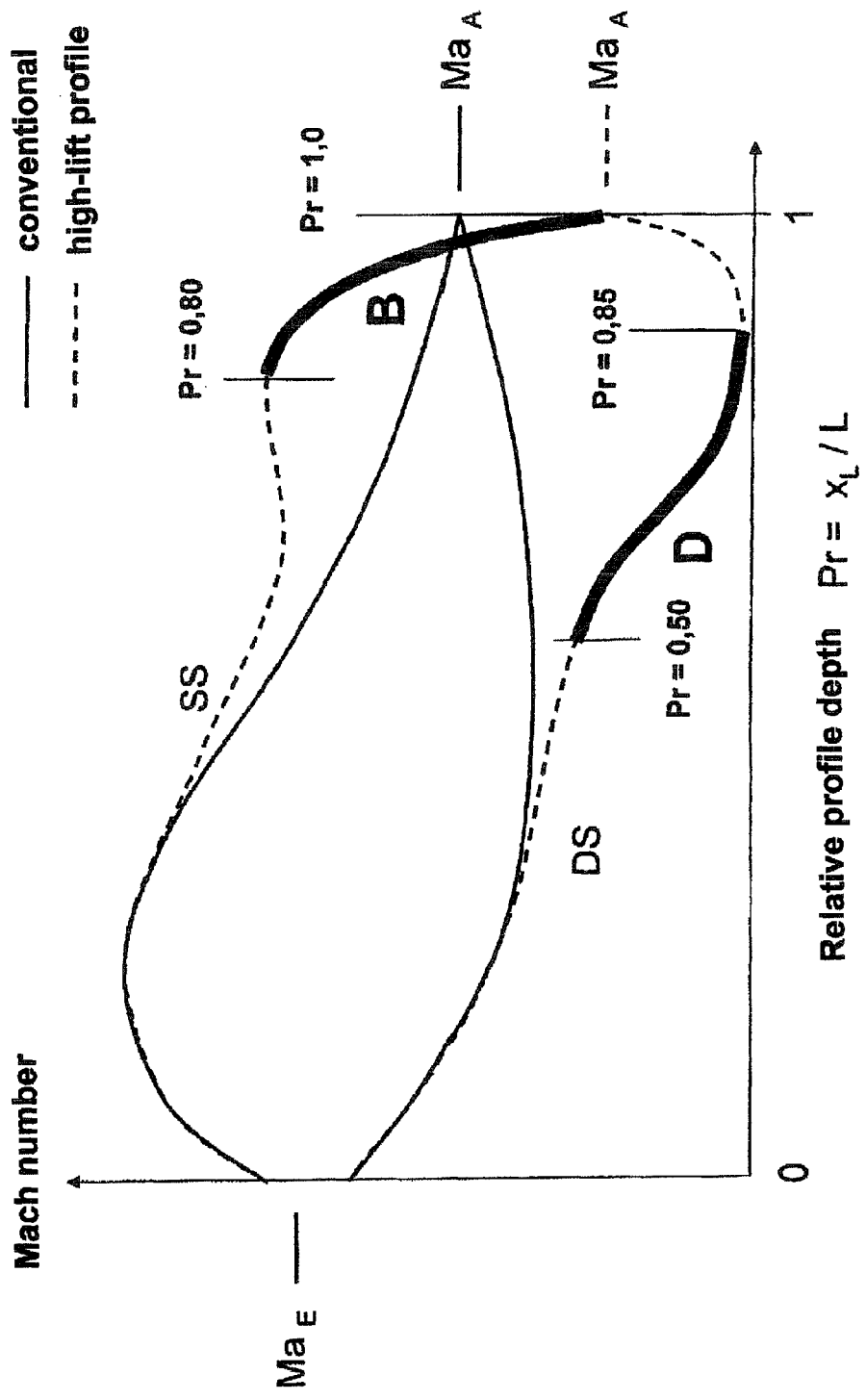
Figure 6C:
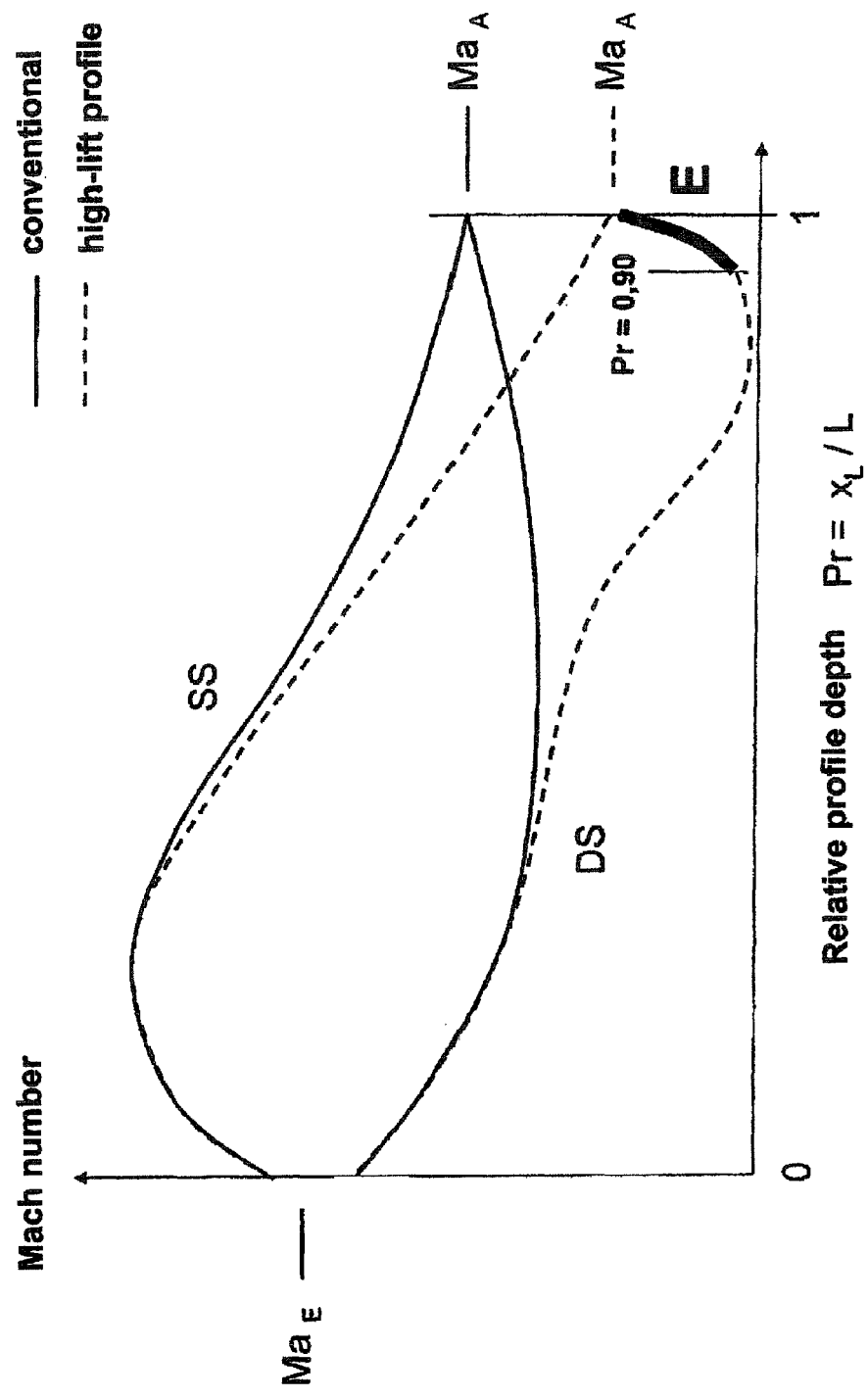
Figure 7:
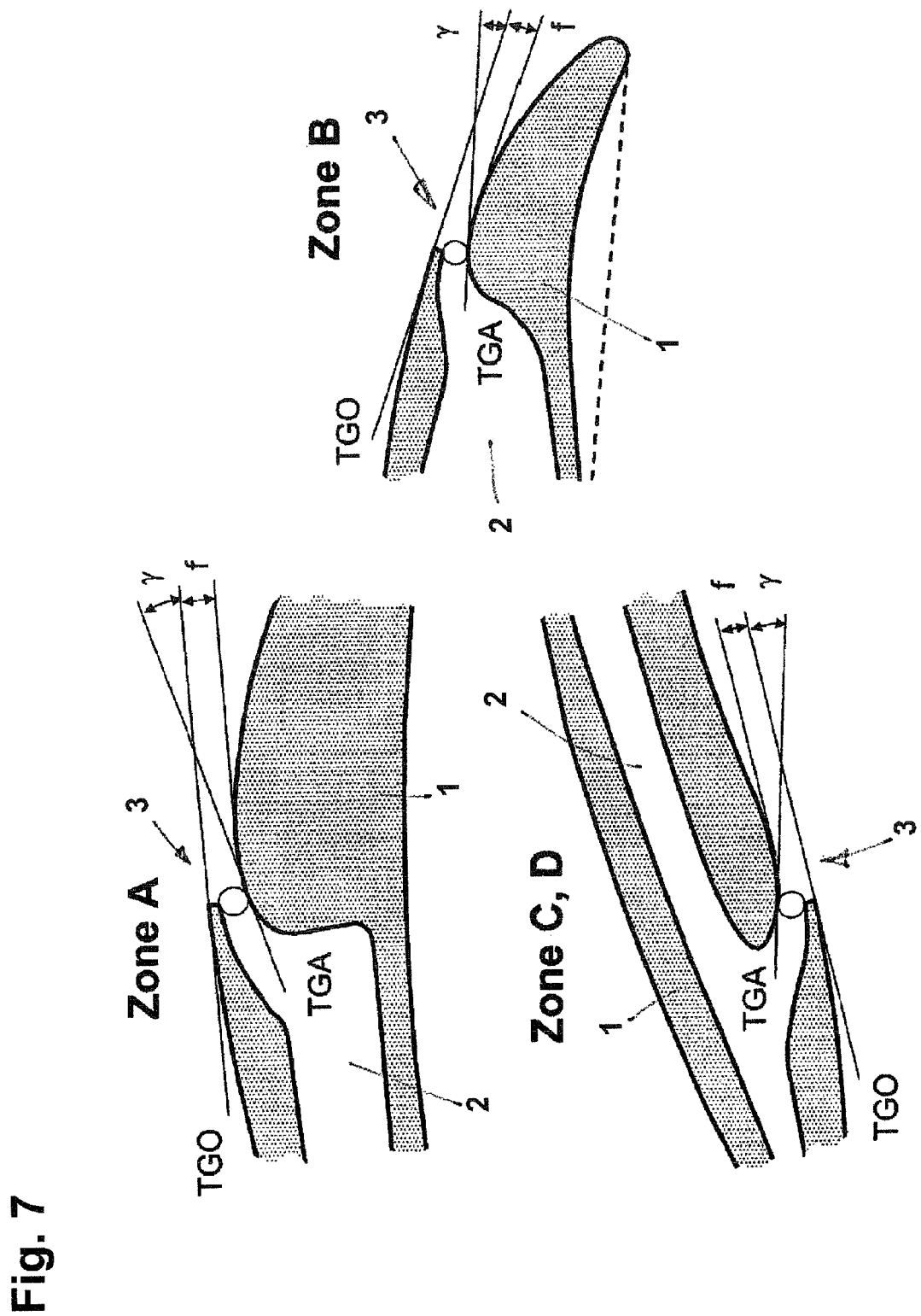
Figure 8B:
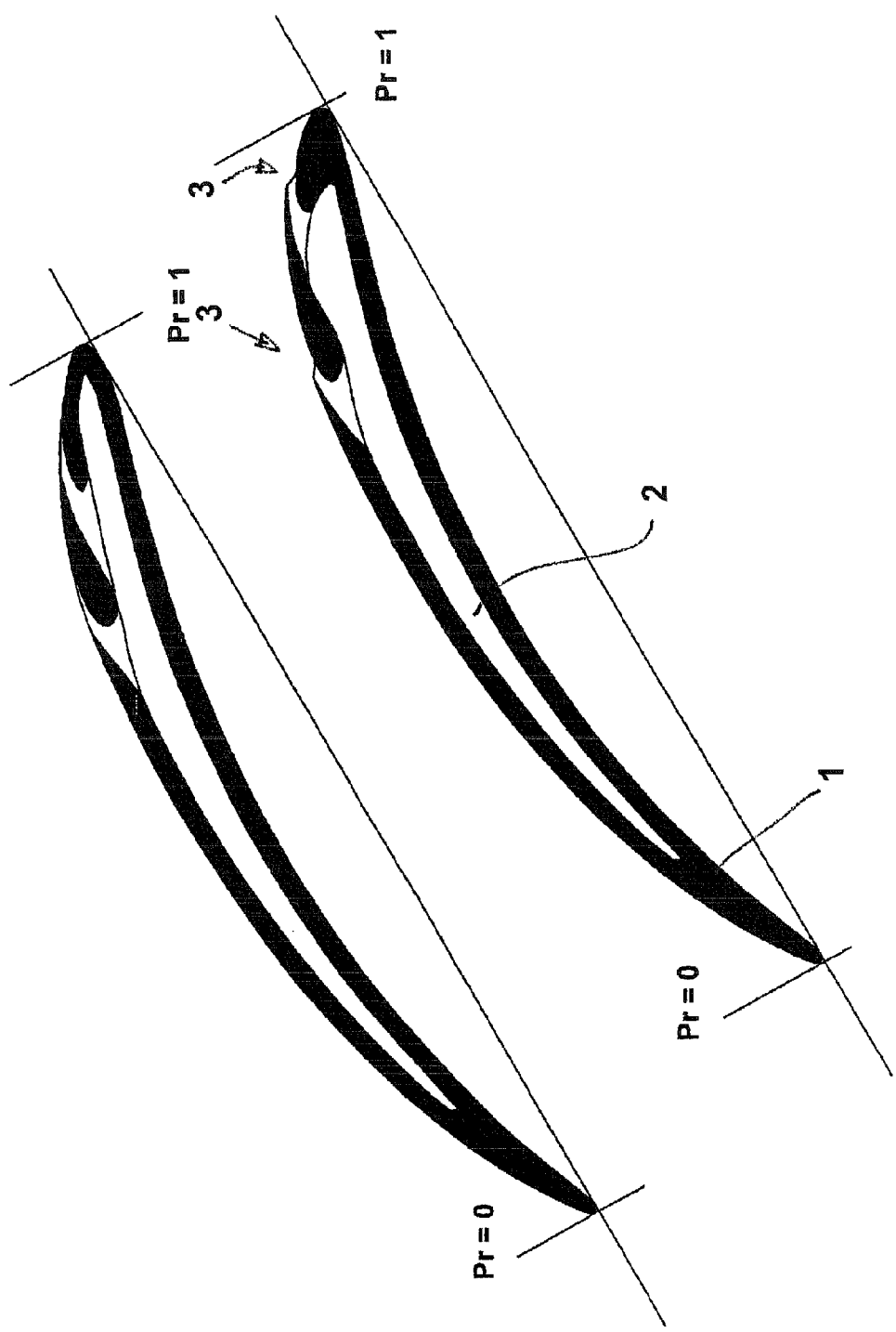
Figure 8C:
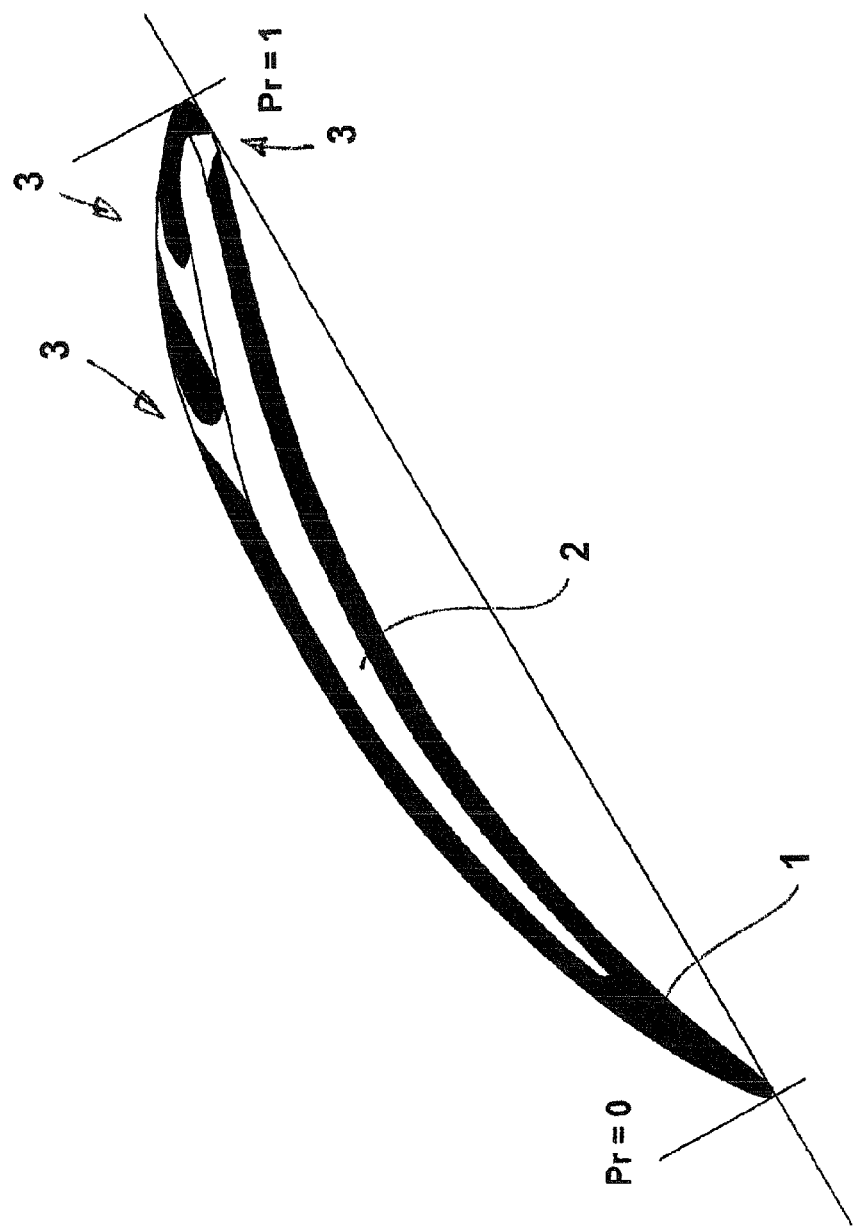
Figure 8D:
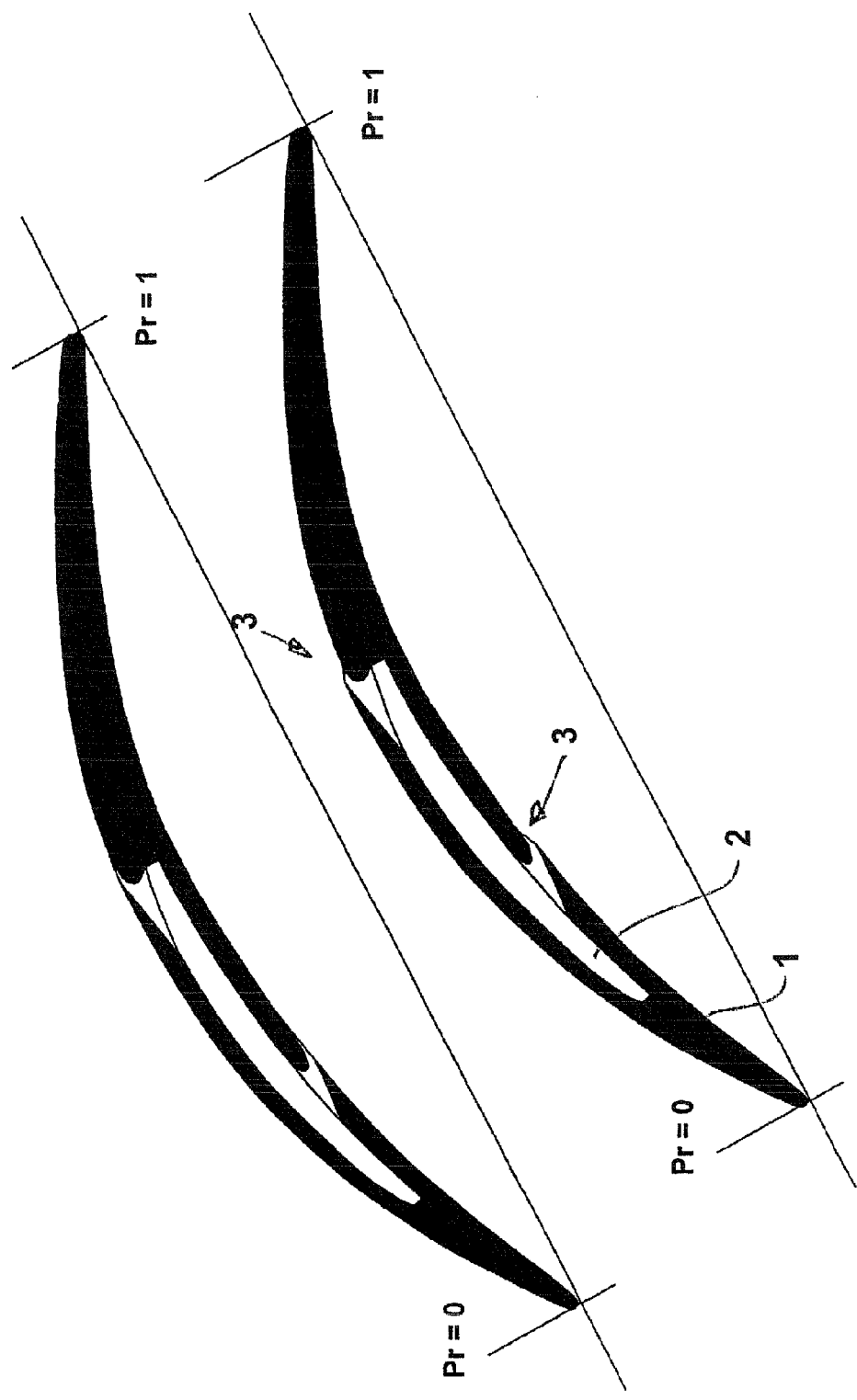
Figure 8E:
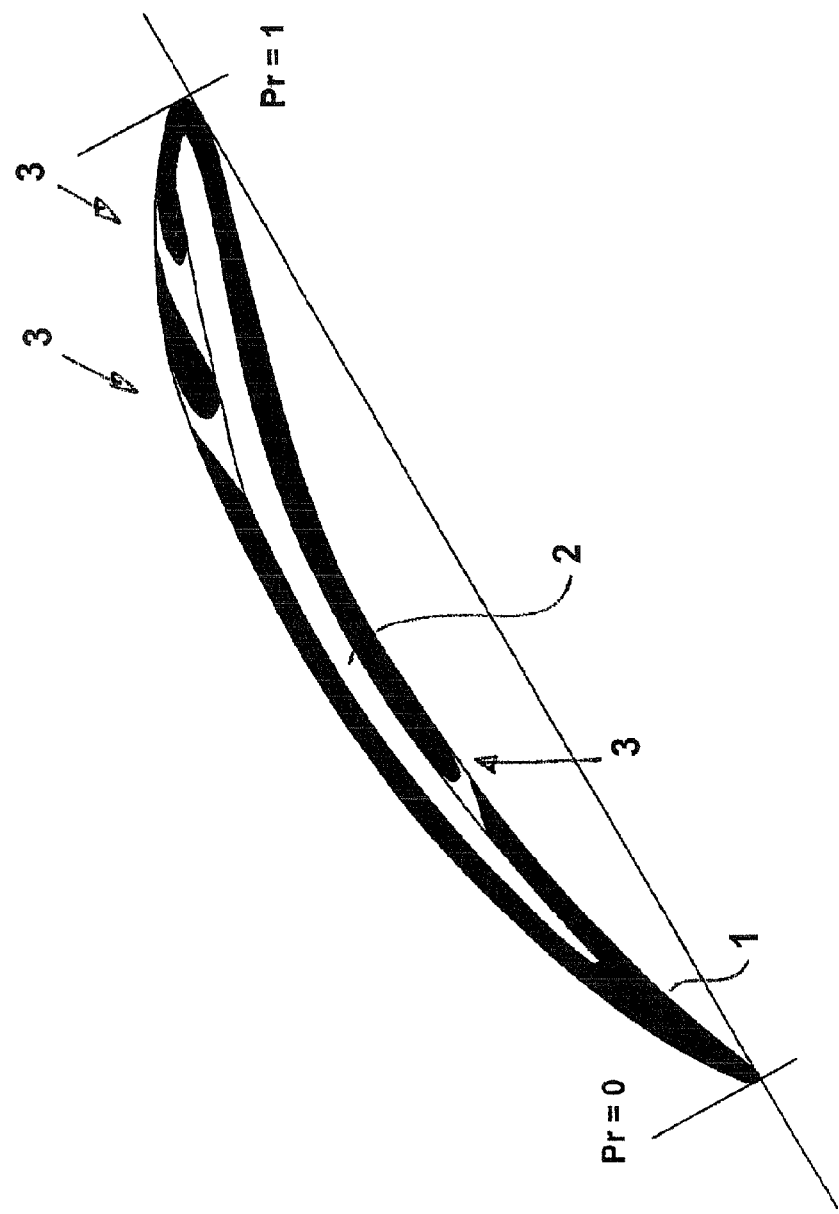
Figure 9A:
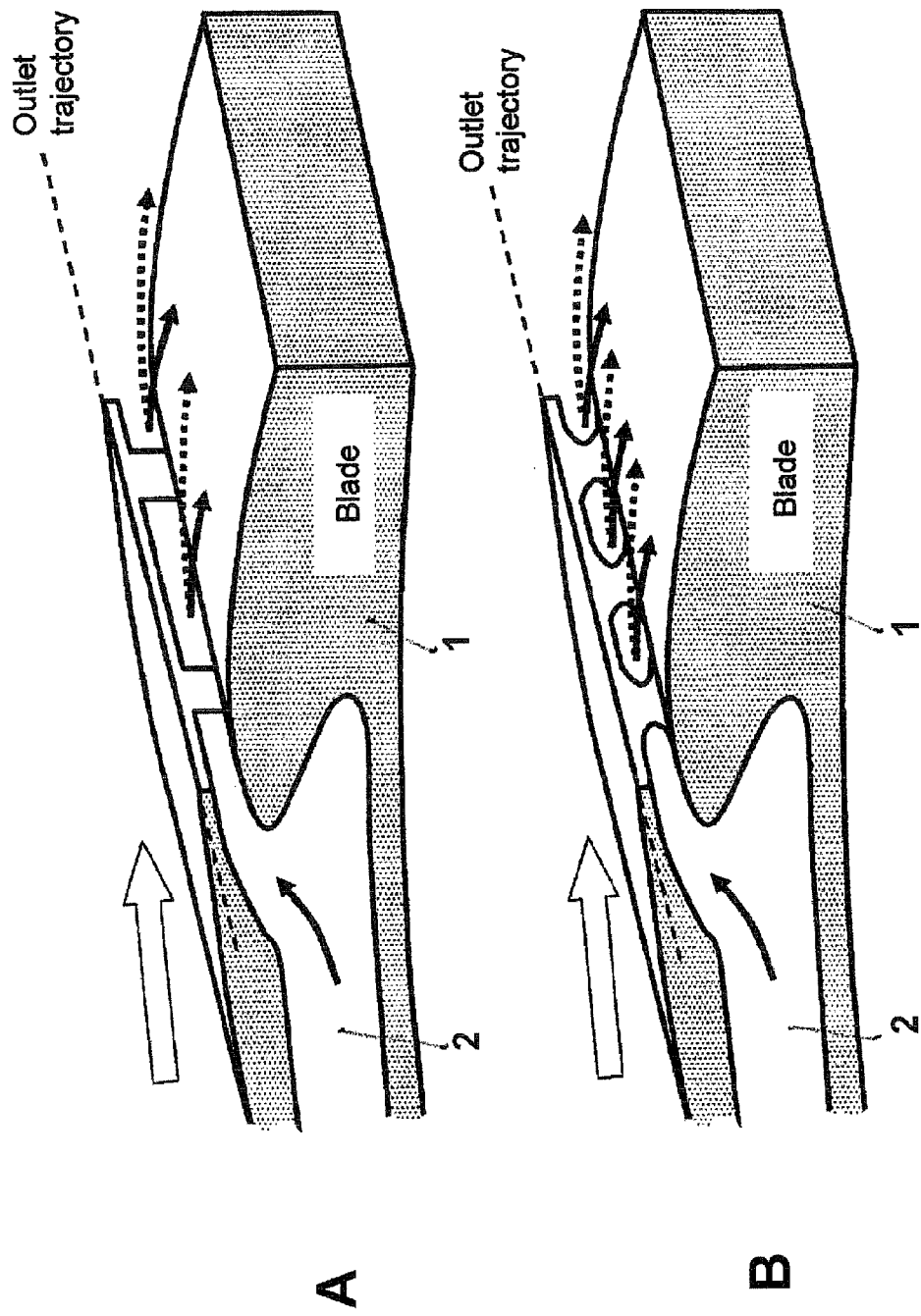
Figure 11:
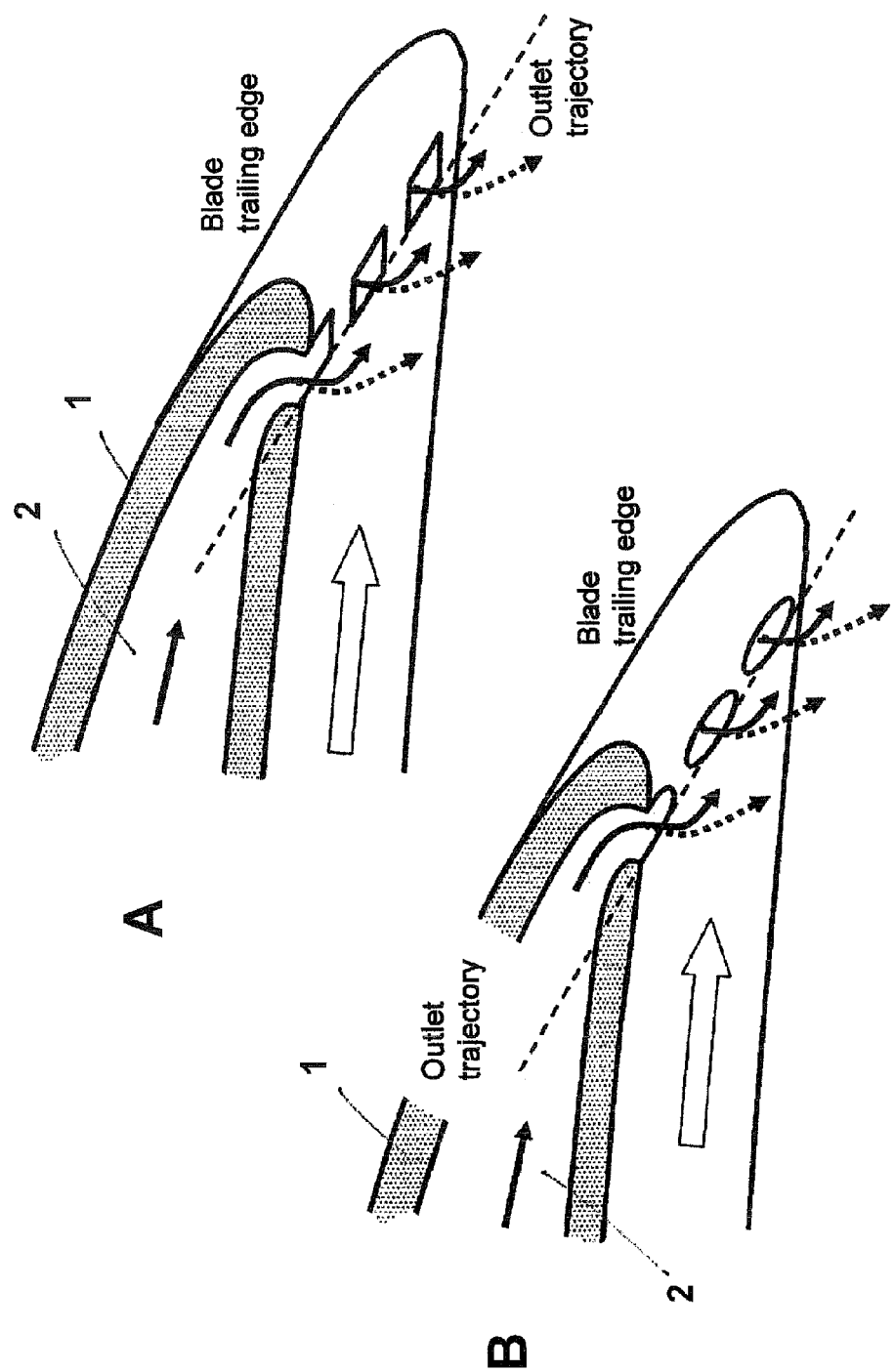

The present invention is more fully described in the light of the accompanying drawings showing preferred embodiments. In the drawings, FIG. 1 is a schematic representation of a blade in accordance with the state of the art, FIG. 2 shows possible configurations of fluid-flow machines relevant to the present invention, FIG. 3 provides the definition of meridional flow lines and flow-line profile sections, FIG. 4a provides an example of a blade in accordance with the present invention, FIG. 4b provides another example of a blade in accordance with the present invention, FIG. 5a provides the definition of the outlet in accordance with the present invention, target direction of the tangential jet, FIG. 5b provides the definition of the outlet in accordance with the present invention, as viewed in a free sectional plane, nozzle-type shape, FIG. 5c provides the definition of the outlet in accordance with the present invention, as viewed in a free sectional plane, transition to surface, FIG. 5d provides the definition of the outlet in accordance with the present invention, as viewed in a free sectional plane, with separator or deflection aid, FIG. 6a provides profile load distribution and definition of outlet positions in accordance with the present invention, part 1, FIG. 6b provides profile load distribution and definition of outlet positions in accordance with the present invention, part 2, FIG. 6c provides profile load distribution and definition of outlet positions in accordance with the present invention, part 3, FIG. 7 provides examples of outlets in accordance with the present invention, FIG. 8a provides examples of a blade in accordance with the present invention in flow-line profile section with outlet in the zones A and E, FIG. 8b provides examples of a blade in accordance with the present invention in flow-line profile section with outlet in the zones A and B, FIG. 8c provides examples of a blade in accordance with the present invention in flow-line profile section with outlet in the zones A, B and E, FIG. 8d provides examples of a blade in accordance with the present invention in flow-line profile section with outlet in the zones A and C, FIG. 8e provides examples of a blade in accordance with the present invention in flow-line profile section with outlet in the zones A, B and C, FIG. 9a provides the design of the outlet in accordance with the present invention in duct width direction, zones A, B, C, D, line orientation, FIG. 9b provides the design of the outlet in accordance with the present invention in duct width direction, zones A, B, C, D, rotated orientation, FIG. 10 provides the design of the outlet in accordance with the present invention in zone E, as viewed in a free sectional plane, nozzle-type shape, FIG. 11 provides the design of the outlet in accordance with the present invention in duct width direction, zone E.

A conventional state-of-the-art blade, as shown in FIG. 1, features no nozzle-type outlets with step over a selected part of the blade height for the generation of a tangential jet. The right-hand side of FIG. 1 shows, in simplified form, a rotor or stator blade row in meridional section with the inflow passing from the left to the right (bold arrow). With conventional blades, the flow passes around the individual profile sections of the blades (see flow-line profile section P-P) with moderate deflection and without being influenced on its way from the leading edge to the trailing edge. In the right-hand bottom part of the illustration, the profile depth of the profile L, and the co-directional co-ordinate xL are defined.

The provisions on the design and disposition of outlets according to the present invention described hereinafter need to be preceded with a basic definition of auxiliaries. FIG. 3 provides a definition of the meridional flow lines and the flow-line profile sections. The mean meridional flow line is established by the geometrical center of the annulus. If a perpendicular is erected at any point of the mean flow line, the development of annulus width W along the flow path and a number of perpendiculars is obtained by which, with equal relative division of the perpendiculars in the direction of the annulus width, further meridional flow lines may be determined. The section of a meridional flow line with a blade provides a flow-line profile section.

Figure 4A:
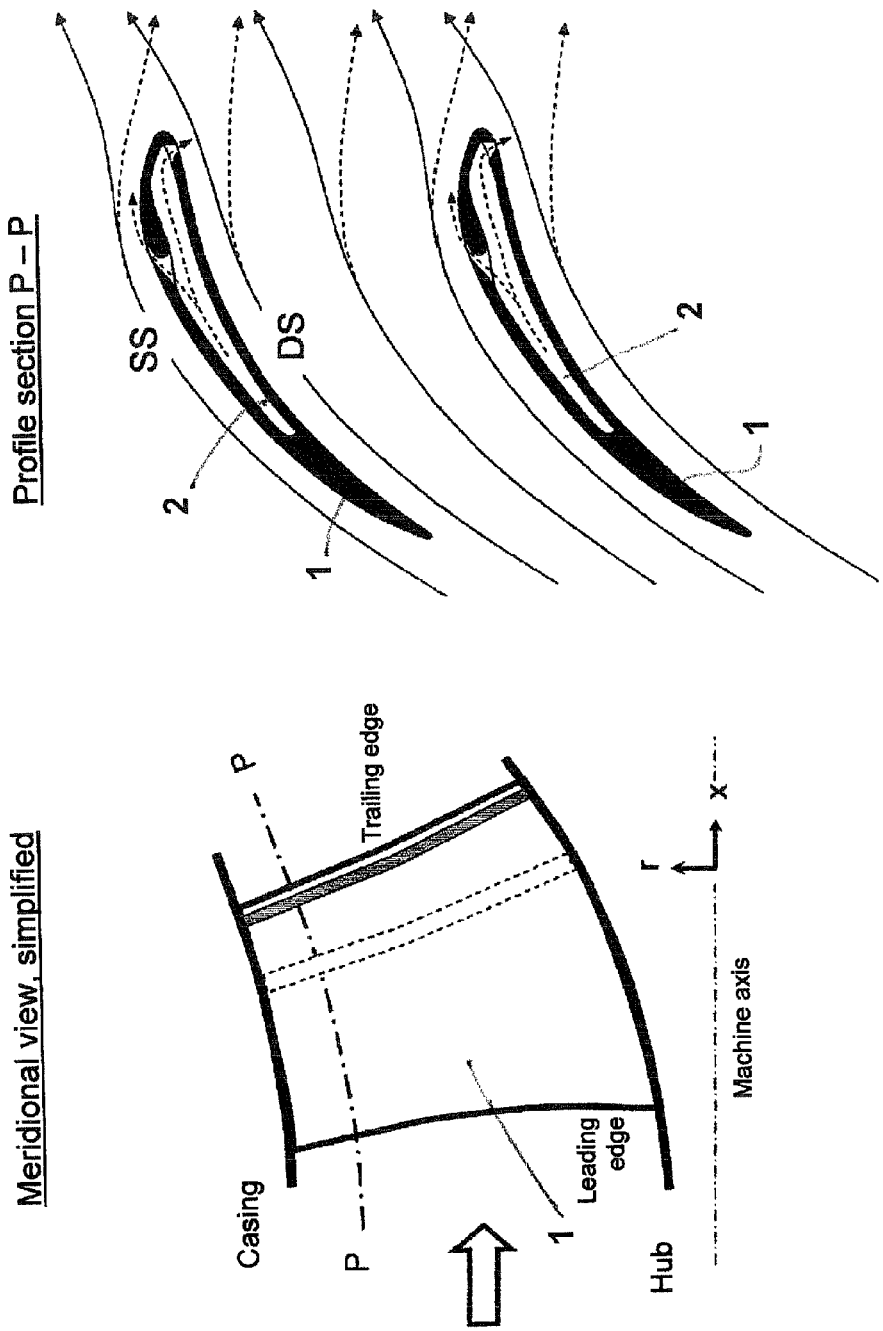
Figure 4B:
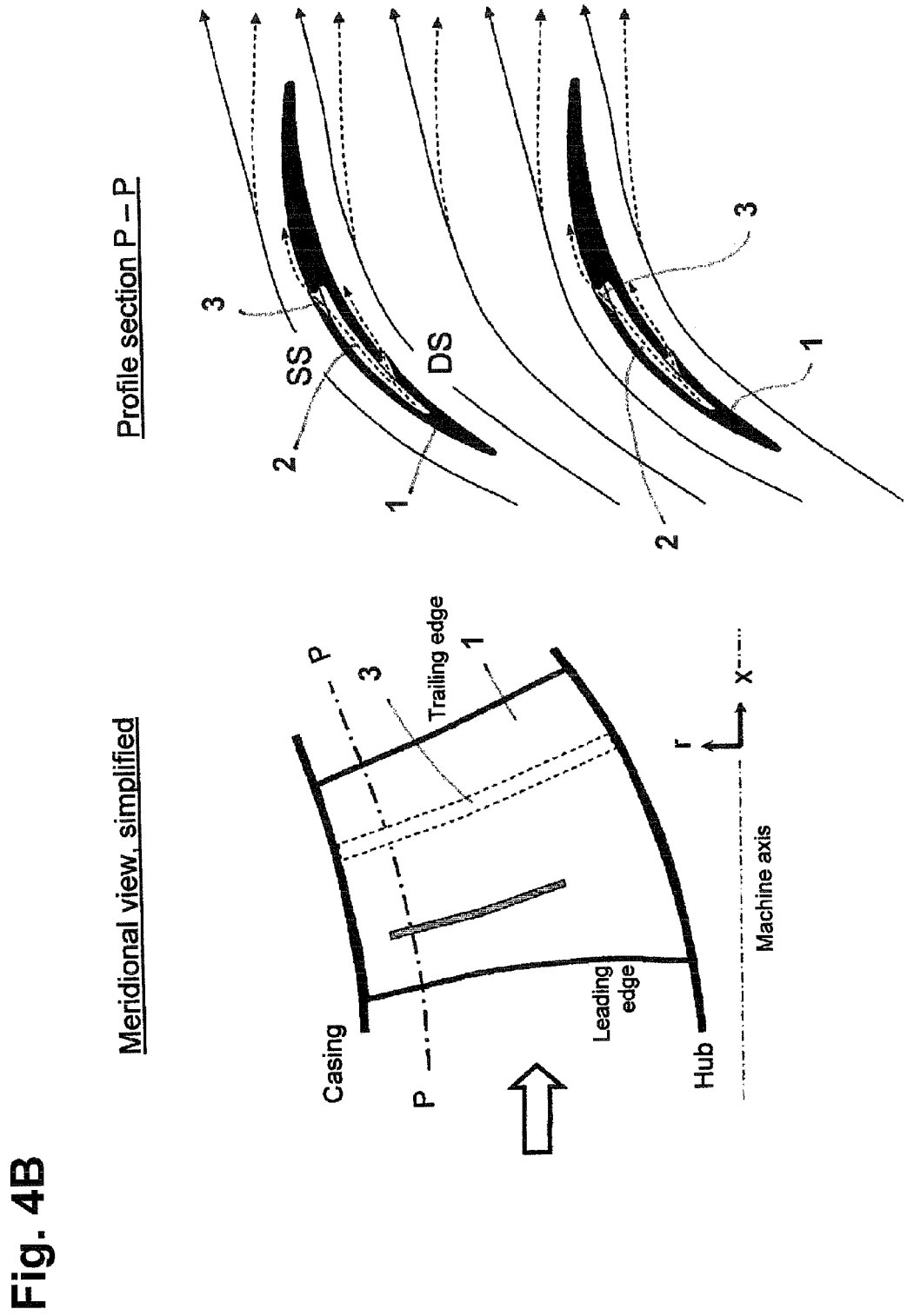

FIG. 4a shows the example of a blade according to the present invention. Here again, the blade is shown in meridional section with the inflow passing from the left to the right (left-hand side of the illustration) and in a selected flow-line profile section P-P (right-hand side of the illustration). In the illustration shown, the blade has two outlets which, in the present illustration, extend over the entire blade height or, other than in the present illustration, can also be disposed in only a selected partial area of the blade height (annulus width W). In accordance with the present invention, the suction-side outlet features a nozzle-type shape inclined in the main flow direction and produces a fluid jet attaching essentially tangentially onto the profile surface. The outlet opening is part of a local step inevitably forming in the profile contour. The fluid jet, in the example here considered, provides that the boundary layer flow remains attached to the suction side, with the consequence of a significant increase in the deflectability of the flow. In connection with the suction-side outlet, a further outlet can, according to the present invention, be additionally arranged in the immediate trailing edge area of the profile, as shown in FIG. 4a, which provides for jet generation essentially non-tangentially to the profile surface. By way of special tuning and positioning of the outlets provided in accordance with the present invention and specific activation/deactivation of at least one of the outlets, the outlet flow direction of the blade row is controllable with a variation range of the outlet flow angle of more than 5 degrees. The indicated flow line pattern around the profile shows this for a non-active outlet (continuous lines) and for an active outlet (broken lines).

FIG. 4b shows a further example of a blade according to the present invention, here with different profile shape and one outlet for tangential jet generation on the suction side and one on the pressure side of the blade. In accordance with the present invention, each outlet may extend over a part of the blade height only, here shown on the example of the pressure-side outlet. Here again, controllability of the outlet flow angle is provided by way of activation/deactivation of the outlet.

FIG. 4a and FIG. 4b only schematically show the outlet according to the present invention, and the direction of the fluid jet issuing from the outlet provided by the present invention is not fully illustrated.

FIG. 5a shows the view on the suction-side or the pressure-side surface of the blade and the direction of the main flow approaching the outlet, or its boundary layer, in the immediate vicinity of the profile. The main flow extends (as defined in FIG. 3) in the plane of a flow-line section. In accordance with the present invention, the jet issuing from the outlet tangentially attaches onto the blade surface. However, the jet direction need not be parallel to the approaching main or boundary layer flow, but is, in accordance with the present invention, inclined at the outlet position relative to this reference direction by the shear angle $\phi$ in an angular range of $-90°<\phi<90°$. The shape of the outlet or additional deflection aids provided in the outlet according to the present invention determine the shear angle $\phi$.

FIG. 5b shows, in a freely definable sectional plane through the blade, the characteristics of the outlet according to the present invention. The characteristics of the outlet are described by two inscribed circles and the center line of the outlet in the one plane here considered. Firstly, the smallest cross-section of the outlet is found entering it from the outside of the blade. The smallest cross-section has the width e, but need not lie directly at the opening of the outlet, as shown here. The center of the circle found at the smallest cross-section is marked ME. Going further into the outlet, other, continuously increasing circles can be inscribed to establish the center line GML of the outlet. Along the center line GML, the effective length k of the outlet is measured, which, further in the interior of the blade, is limited by the center MI of a final circle inscribed.

FIG. 5c shows, in a freely definable sectional plane through the blade, the characteristics of the outlet according to the present invention similar to FIG. 5b, however with new designations. Further characteristics of the outlet according to the present invention as regards its transition to the surface are here shown. As in FIG. 5b, the throat of the outlet has the width e. The point of contact of the circle inscribed in the throat with the inner confining outlet contour, which at this point is convex, is lettered P. The tangent TGA and the tangent TGO are here used to describe the transition of the outlet into the surface of the blade. TGA is the tangent in point P to the inner outlet-confining contour. TGO is a tangent to a circle (not shown in the illustration) through the blade surface points X, Y and Z. Point X is established as the intersection of an orthogonal traced on TGA tangentially to the circle in the throat. Point Y is located at a distance of two throat widths (2e) upstream of point X, measured along the blade outer contour. Point Z is located at a distance of two throat widths (2e) upstream of point Y, measured along the blade outer contour.

Also crucial is the step height f which is measured as the orthogonal distance of point Q from the tangent TGO. Point Q is located at a distance of two throat widths (2e) downstream of point P.

In accordance with the present invention the design of the outlet is defined as follows:
a.) the throat of the outlet is at or near the outlet opening,
b.) the outlet has, from the throat towards the blade interior, a cross-sectional width which continually increases over the entire effective length k (nozzle-type shape between the beginning and the end circle centers MI and ME),
c.) the effective length k, relative to the throat width e, lies in the value range k/e>0.7,
d.) the mouth angle $\gamma$ included by the tangents TGO and TGA lies in the value range $0°<\gamma<60°$,
e.) the step height f, relative to the throat width e, lies in the value range $0<f/e<3$.

FIG. 5d shows an outlet with additional design elements. In a special design according to the present invention at least one separator may be provided in the area of the outlet or also in the area of the cavity, which divides or, similar to a blade cascade, also deflects the fluid flow supplied before said fluid flow issues as tangential jet onto the blade surface.

Besides the shape of the outlet, its position on the suction side SS or the pressure side DS is of particular importance. FIG. 6a schematically shows the Mach number distribution plotted over the relative profile depth Pr=xL/L (see FIG. 1 for definition), along the two profile sides of a blade section. The continuous lines show the development for a conventionally designed state-of-the-art profile. This type of profile is, in accordance with the present invention, also improvable as regards its operating characteristics, in that one of its profile sides is provided with an outlet. However, it is particularly favorable if a distinctly higher loaded profile is provided with one or more outlets. Such high-lift profiles provide for a generally stronger retardation of the flow (between inlet mach number MaE and outlet mach number MaA), with the consequence that the boundary layer flow on both sides of the profile is more difficult to control. The Mach number development on the pressure and suction sides of a potential high-lift profile is also shown in FIG. 6a using broken lines. In the form selected, the profile provides for strong retardation in the rearward part of the suction side and in the forward part of the pressure side, where the arrangement of an outlet with tangential jet generation is particularly effective. The present invention accordingly provides for an arrangement of at least one outlet in at least one of the zones marked A, i.e. on the suction-side in the area 0.5<Pr<0.85 or C, i.e. on the pressure side in the area 0.1<Pr<0.4.

In FIG. 6b, the selected profile provides for strong retardation in the trailing edge-near part of the suction side and in the rearward part of the pressure side, where the arrangement of an outlet with tangential jet generation is particularly effective. The present invention accordingly provides for an arrangement of at least one outlet in at least one of the zones marked B, i.e. on the suction-side in the area 0.8<Pr<1.0 or D, i.e. on the pressure side in the area 0.5<Pr<0.85.

In FIG. 6c, the selected profile provides for strong retardation in the trailing-edge near part of the pressure side which, in the indicated form, is only achievable via a non-tangential jet which, on the pressure side, is located as closely as possible to the trailing edge and oriented at a steep angle to the profile enveloping flow. Therefore, in accordance with the present invention, an outlet for the generation of a non-tangential jet in the zone marked E, i.e. on the pressure side in the area 0.9<Pr<1.0 can be provided as complementary measure to any outlet arrangement in the zones A, B, C and D to obtain a particularly favorable design of the blade.

In FIG. 7 provides examples of outlets in accordance with the present invention in the zones A, B, C and D.

FIG. 8a shows, by way of example, two arrangements of a high-lift profile according to the present invention with outlets in the zones A and E.

FIG. 8b shows, by way of example, two arrangements of a high-lift profile according to the present invention with two outlets on the suction side, one arranged in zone A and one in zone B. Irrespective of the arrangement in the zones A, B, C and D established as particularly advantageous in accordance with the present invention, it is particularly favorable according to the present invention to provide, over a part or the entirety of the blade height, at least two outlets for tangential jet generation disposed, one behind the other, in the main flow direction or in a flow-line section, respectively.

FIG. 8c shows, by way of example, the arrangement of a high-lift profile according to the present invention with outlets in the areas A, B and E.

FIG. 8d shows, by way of example, two arrangements of a high-lift profile according to the present invention with one outlet provided on the suction side in zone A and one outlet on the pressure side in zone C. Irrespective of the arrangement in the zones A, B, C and D established as particularly favorable in accordance with the present invention, it is particularly advantageous according to the present invention to provide, over a part or the entirety of the blade height, at least one outlet each for tangential jet generation disposed at the same time on the suction and on the pressure side in the main flow direction or in a flow-line section, respectively.

FIG. 8e finally shows, by way of example, the arrangement of a high-lift profile according to the present invention with outlets in the zones A, B and C.

As regards the design of an outlet according to the present invention in the direction of the blade height or the duct width W, respectively, FIG. 9a shows by way of the example of an enlarged portion of a blade, two possible arrangements applicable to zones A, B, C, D. Not shown here, but included in the solution scope according to the present invention, is an arrangement with a slot extending continuously over the respective part of the blade height (duct width). In part (a) of the illustration, a more complex configuration according to the present invention is shown which comprises several partial slots disposed side by side and divided by separators or deflection aids. Depending on the detail design according to the present invention, the outlet enables the tangential jet to be oriented orthogonally (continuous arrows in FIG. 9a) or also non-orthogonally (broken arrows in FIG. 9a) to the outlet trajectory. In part (b) of the illustration, a further configuration according to the present invention is shown which comprises several oblong holes disposed side by side and divided by separators or deflection aids. The distance of the individual openings of the outlet may, as shown here, be approximately equal or, as not shown here, be variable along the outlet trajectory. The outlet step may, as shown here, extend continuously along the outlet trajectory or, as not shown here, be interrupted and accordingly disposed only in the area of the respective individual openings of the outlet.

As a further inventive design of an outlet in the direction of the blade height or the duct width W, respectively, FIG. 9b shows, on the example of an enlarged portion of a blade, an arrangement in which several individual outlets are rotatedly arranged along an outlet trajectory, applicable to zones A, B, C, D. Thus, the direction of the tangential jet extends non-orthogonally to the outlet trajectory and under the already known shear angle $\phi$.

FIG. 10 shows, in a freely definable sectional plane through the blade, the characteristics of an outlet according to the present invention in zone E. The characteristics of the complementary outlet are described by way of the centers MI and ME of two circles inscribed in the outlet (with the circles themselves not being indicated) and the center line of the outlet in the one plane here considered. Firstly, the smallest cross-section of the outlet is found entering it from the outside of the blade. The smallest cross-section has the width e, but is not necessarily located directly at the opening of the outlet, as shown here. The center of the circle found in the smallest cross-section is lettered ME. Going further into the outlet, other, continually increasing circles can be inscribed to establish the center line GML of the outlet. The effective extension s of the outlet is established between the points ME and MI, measured in the direction of the chord of the profile. The trailing edge protrusion depth j is found between point ME and the profile chord. The mouth angle $\gamma$ lies between the direction of the center line GLM in point ME and the profile chord.

In accordance with the present invention the design of the complementary outlet is defined as follows:

a.) the throat of the outlet is at or near the outlet opening, b.) the outlet has, from the throat towards the blade interior, a cross-sectional width which continually increases over the entire effective extension s (nozzle-type shape between the beginning and the end circle centers MI and ME), c.) the effective extension s, relative to the throat width e, lies in the value range $s/e > 0.7$, d.) the mouth angle $\gamma$ included by the tangents TGO and TGA lies in the value range $45° < \gamma < 135°$, e.) the trailing edge protrusion depth j, relative to the throat width e, lies in the value range $0 < j/e < 10$.

As regards the design of a complementary outlet according to the present invention in the direction of the blade height or the duct width W, respectively, FIG. 11 shows by way of example of an enlarged trailing edge portion of a blade two possible arrangements applicable to zone E. Not shown here, but included in the solution scope according to the present invention, is an arrangement with a slot extending continuously over the respective part of the annulus width (blade height). In part (a) of the illustration, a more complex configuration according to the present invention is shown which comprises several partial slots disposed side by side and divided by separators or deflection aids. Depending on the detail design according to the present invention, the outlet enables the jet to be oriented orthogonally (continuous arrows in FIG. 11) or also non-orthogonally (broken arrows in FIG. 11) to the outlet trajectory. In part (b) of the illustration, a further configuration according to the present invention is shown which comprises several oblong holes disposed side by side and divided by separators or deflection aids. The distance of the individual openings of the outlet may, as shown here, be approximately equal or, as not shown here, be variable along the outlet trajectory.

The present invention provides for a significantly higher aerodynamical loadability of rotors and stators in fluid-flow machines, with efficiency being maintained or even improved. A reduction of the number of components and of the component weight by more than 20 percent seems to be feasible. Application of the concept to the high-pressure compressor of an aircraft engine with approx. 25,000 lbs thrust leads to a reduction of the specific fuel consumption of up to 0.5 percent.

What is claimed is:

1. A blade of a fluid-flow machine with at least one cavity positioned in the blade, with said cavity connecting to a fluid supply, and at least one outlet having an opening and connecting the cavity to a flow path in which the blade is positioned, wherein:

the outlet opening is of a nozzle-type design and essentially inclined in a direction of a main flow extending longitudinally to a corresponding surface of the blade, the outlet opening extends over at least a part of the blade height, and the outlet opening forms a step in the contour of the blade profile, with a fluid jet issuing from the outlet opening essentially tangentially attaching onto the surface;

wherein the outlet is configured such that:

a throat of the outlet is at or near the outlet opening, the outlet has, from the throat towards a blade interior, a cross-sectional width which continually increases over an entire effective length k, corresponding to a nozzle-type shape between beginning and ending diameter circle centers MI and ME.

2. The blade of claim 1, wherein the outlet opening extends over substantially an entirety of the blade height.

3. The blade of claim 1, wherein the outlet opening extends over a part of a width of an annulus, in which the blade is positioned.

4. The blade of claim 1, wherein the outlet opening extends over substantially an entirety of a width of an annulus, in which the blade is positioned.

5. The blade of claim 1, and further comprising at least one separator provided in an area of the outlet, with said separator at least one of dividing and deflecting the fluid flow supplied, before said fluid flow issues as a tangential jet onto the blade surface.

6. The blade of claim 1, and further comprising at least one separator provided in an area of the cavity, with said separator at least one of dividing and deflecting the fluid flow supplied, before said fluid flow issues as a tangential jet onto the blade surface.

7. The blade of claim 1, wherein the outlet opening is configured such that a jet direction of the issuing fluid at a location of the outlet opening and a direction of a main or boundary layer flow, respectively, at the blade profile include a shear angle $\phi$ which has values in the angular range $-90°<\phi<90°$.

8. The blade of claim 1, wherein the outlet is configured such that:

the effective length k, relative to a throat width e, lies in a value range k/e>0.7, a mouth angle v included by tangent lines TGO and TGA lies in the value range $0°<\gamma<60°$, where tangent line TGA and tangent line TGO describe a transition of the outlet into the surface of the blade, with TGA being tangent to point P on an inner outlet-confining contour, which point P is also tangential to a first circle defining a width e of the throat, and TGO being tangent at point X to a second circle through blade surface points X, Y and Z, where point X is an intersection of an orthogonal traced on TGA tangentially to the first circle, point Y is located at a distance of two throat widths (2e) upstream of point X, measured along a blade outer contour and point Z is located at a distance of two throat widths (2e) upstream of point Y, measured along the blade outer contour, a step height f, relative to the throat width e, lies in the value range 0<f/e<3.

9. The blade of claim 1, and including at least one outlet opening for tangential jet generation provided in an area of relative profile depth 0.5<Pr<0.85 on a blade suction side.

10. The blade of claim 1, and including at least one outlet opening for tangential jet generation provided in an area of relative profile depth 0.1<Pr<0.4 on a blade pressure side.

11. The blade of claim 1, and including at least one outlet opening for tangential jet generation provided in an area of relative profile depth 0.8<Pr<1.0 on a blade suction side.

12. The blade of claim 1, and including at least one outlet opening for tangential jet generation provided in an area of relative profile depth 0.5<Pr<0.85 on a blade pressure side.

13. The blade of claim 1, and including at least one outlet opening for tangential jet generation provided on a blade suction side and also at least one outlet opening for tangential jet generation provided on a blade pressure side.

14. The blade of claim 13, wherein the at least one suction side outlet opening is provided on the suction side in an area of relative profile depth 0.5<Pr<0.85 and the at least one pressure side outlet opening is provided on the pressure side in an area of relative profile depth 0.1<Pr<0.4.

15. The blade of claim 13, wherein the at least one suction side outlet opening is provided on the suction side in an area of relative profile depth 0.8<Pr<1.0 and the at least one pressure side outlet opening is provided on the pressure side in an area of relative profile depth 0.5<Pr<0.85.

16. The blade of claim 1, including at least two outlet openings for tangential jet generation provided one behind another on a blade suction side in a flow direction.

17. The blade of claim 1, including at least two outlet openings for tangential jet generation provided one behind another on a blade pressure side in a flow direction.

18. The blade of claim 1, including, at least one further complementary outlet having an opening arranged in an area of a profile trailing edge which, by virtue of its orientation, effects a jet generation oriented non-tangentially to the profile enveloping flow.

19. The blade of claim 18, wherein the at least one further complementary outlet opening is effectively provided in an area of relative profile depth 0.9<Pr<1.0 on a blade pressure side.

20. The blade of claim 18, wherein the complementary outlet is configured such that:

a throat of the outlet is at or near the outlet opening, the outlet has, from the throat towards the blade interior, a cross-sectional width which continually increases over an entire effective extension s to have a nozzle-type shape between beginning and end circle centers MI and ME, the effective extension s, relative to a throat width e, lies in a value range s/e>0.7, the mouth angle $\gamma$ included by the tangents TGO and TGA lies in the value range $45°<\gamma<135°$, where tangent line TGA and tangent line TGO describe a transition of the outlet into the surface of the blade, with TGA being tangent to point P on an inner outlet-confining contour, which point P is also tangential to a first circle defining the width e of the throat, and TGO being tangent at point X to a second circle through blade surface points X, Y and Z, where point X is an intersection of an orthogonal traced on TGA tangentially to the first circle, point Y is located at a distance of two throat widths (2e) upstream of point X, measured along a blade outer contour and point Z is located at a distance of two throat widths (2e) upstream of point Y, measured along the blade outer contour, a trailing edge protrusion depth j, relative to the throat width e, lies in a value range 0<j/e<10.

21. The blade of claim 1, wherein at least one outlet opening on the blade surface has a trajectory, which continually or sectionally, agrees with an edge of the outlet step in line orientation.

22. The blade of claim 21, wherein at least one outlet opening along the trajectory comprises several partial openings created by subdivision in round-hole, oblong, square or slot style and can be varied with regard to distance and shape.

23. The blade of claim 1, wherein at least one outlet opening on the blade surface has a trajectory, which only in places touches edges of rotatedly arranged openings.

24. The blade of claim 1, wherein by way of activation and deactivation of the fluid supply of at least one outlet opening, controllability of an outlet flow direction of the blade row with a variation range of an outlet flow angle of more than 5 degrees is achieved in at least one partial area of the annulus width or the blade height, respectively.

25. The blade of claim 1, wherein the blade is arranged in a first stator row downstream of a fan of an aircraft engine in a core or bypass flow.

26. The blade of claim 25 wherein at a center of a flow path annulus, a profile depth of the stator exceeds a profile depth of an immediately downstream or upstream rotor by at least 20 percent.

27. The blade of claim 1, wherein the blade is arranged in a stator row of a multi-stage high- or medium-pressure compressor of an aircraft engine.

28. The blade of claim 1, wherein a ratio of a flow path annulus width at a blade leading edge to a profile depth at a center of the annulus is less than 1.

* * * * *